(12) United States Patent
Otsu et al.

(10) Patent No.: US 6,604,225 B1
(45) Date of Patent: *Aug. 5, 2003

(54) CALCULATION OF ELECTROMAGNETIC FIELD INTENSITY BY MOMENT METHOD

(75) Inventors: Shinichi Otsu; Makoto Mukai, both of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 46 days.

(21) Appl. No.: 08/749,679

(22) Filed: Nov. 15, 1996

(30) Foreign Application Priority Data

Nov. 16, 1995 (JP) .............................................. 7-298062
Dec. 28, 1995 (JP) .............................................. 7-342695

(51) Int. Cl.[7] .............................................. H04B 17/00

(52) U.S. Cl. ............................................ 716/3; 903/14

(58) Field of Search ......................... 364/480, 481–484, 364/489, 578; 324/600, 76.11; 702/57, 64, 65; 716/3; 703/14

(56) References Cited

U.S. PATENT DOCUMENTS

| | | | | |
|---|---|---|---|---|
| 4,229,743 A | * | 10/1980 | Vo et al. | |
| 5,621,649 A | * | 4/1997 | Iwata et al. | 364/483 |
| 5,650,935 A | * | 7/1997 | Nishino et al. | 364/481 |
| 5,745,370 A | * | 4/1998 | Ohtsu et al. | |

FOREIGN PATENT DOCUMENTS

JP         7-302277         11/1995

OTHER PUBLICATIONS

Öing et al. "Some Remarks on the Prediction of Electromagnetic Radiation from Printed Circuit Boards Using the Method of Moments" Electromagnetic Compatibility p 196–201, 1994.*

Theodorou et al. "Transition Properties of a Vertical Conductor Connecting Two Microstrip Lines at Different Planes" IEEE Trans. Microwave Theory and Techniques v. 42 n. 12 p 2277–2284, Dec. 1994.*

Tsuboi et al., "Electromagnetic Field Analysis of the Wire Antenna in the Presence of a Dielectric with Three–Dimensional Shape," *Proceedings of the International Magnetics Conference (Intermag)*, Washington, DC, May 28–31, 1989, IEEE, XP–000079551, p. EC–12.

(List continued on next page.)

*Primary Examiner*—Melanie A. Kemper
(74) *Attorney, Agent, or Firm*—Staas & Halsey LLP

(57) ABSTRACT

In calculating an electromagnetic field intensity by a moment method, real and imaginary parts of a mutual impedance, mutual admittance, and mutual reaction between elements and of the elements themselves are approximated by a sum of terms each with a frequency raised to a power. The mutual impedances, etc. at a plurality of sample frequencies are calculated using known mathematical equations, and simultaneous equations obtained by substituting the sample frequencies and the mutual impedances at the respective sample frequencies into an approximate equation are solved to calculate approximation coefficients for the approximate equation. Using the thus obtained approximate equations, the mutual impedance, etc. at a designated frequency are calculated, and substituted into simultaneous equations describing a boundary condition for each element; by solving the simultaneous equations, the electric current, equivalent electric current, and equivalent magnetic current of each element are calculated, from which the electromagnetic field intensity is calculated.

33 Claims, 16 Drawing Sheets

OTHER PUBLICATIONS

Mukai et al., "Analysis of Radiation from Opening of Metal Cabinet Enclosing Printed Circuit Board," *Proceedings of 1994 International Symposium on Electromagnetic Compatibility*, Sendai, Japan, May 16–20, 1994, XP–002052844, pp. 120–123.

Ohtsu et al., "Analysis of Radiation from Common–mode Current by Moment Method,"Proceedings of 1994 International Symposium on Electromagnetic Compatibility, Sendai, Japan, May 16–20, 1994, XP–002052843, pp. 655–658.

Partial English copy of Office Action for Corresponding Japanese Application.

Virga et al., "Wide–Band Evaluation of Communications Antennas Using [Z] Matrix Interpolation with the Method of Moments" Antennas and Propagation Society International Symposium, IEEE p. 1262–1265, Jun. 1995.*

Gera, "Linking Resistance and Reactance via Hilbert Transforms" Electrical and Electronics Engineers in Israel Proceedings, IEEE, pp. 141–144, Mar. 1991.*

E.H. Newman, "Generation of Wide–Bank Data from the Method of Moments by Interpolating the Impedance Matrix", *IEEE Transactions on Antennas and Propagation*, vol. 36, No. 12, Dec. 1988.

* cited by examiner $$\begin{bmatrix} Z^o_{c,c} & Z^o_{c,d} & B^o_{c,d} \\ Z^o_{d,c} & Z^o_{d,d} + Z^d_{d,d} & B^o_{d,d} + B^d_{d,d} \\ B^o_{d,c} & B^o_{d,d} + B^d_{d,d} & -Y^o_{d,d} - Y^d_{d,d} \end{bmatrix} \begin{bmatrix} I_{c,n} \\ I_{d,n} \\ M_n \end{bmatrix} = \begin{bmatrix} V_i \\ 0 \\ 0 \end{bmatrix}$$

Fig.5

$$\begin{bmatrix} Z^o_{c,c} - Z_L & Z^o_{c,d} & B^o_{c,d} \\ Z^o_{d,c} & Z^o_{d,d} + Z^d_{d,d} & B^o_{d,d} + B^d_{d,d} \\ B^o_{d,c} & B^o_{d,d} + B^d_{d,d} & -Y^o_{d,d} - Y^d_{d,d} \end{bmatrix} \begin{bmatrix} I_{c,n} \\ I_{d,n} \\ M_n \end{bmatrix} = \begin{bmatrix} V_i \\ 0 \\ 0 \end{bmatrix}$$

Fig.6

$$\text{Fig. 7} \quad [M] = \begin{bmatrix} Z^o_{c,c} & Z^o_{c,d} & B^o_{c,d} \\ Z^o_{d,c} & Z^o_{d,d} + Z^d_{d,d} & B^o_{d,d} + B^d_{d,d} \\ B^o_{d,c} & B^o_{d,d} + B^d_{d,d} & -Y^o_{d,d} - Y^d_{d,d} \end{bmatrix}$$

$$\text{Fig. 8} \quad [M'] = \begin{bmatrix} Z^o_{c,c'} & Z^o_{c,d'} & B^o_{c,d'} \\ Z^o_{d,c'} & Z^o_{d,d'} + Z^d_{d,d'} & B^o_{d,d'} + B^d_{d,d'} \\ B^o_{d,c'} & B^o_{d,d'} + B^d_{d,d'} & -Y^o_{d,d'} + Y^d_{d,d'} \end{bmatrix}$$

$$\text{Fig. 9} \quad [[M]-[M']] \begin{bmatrix} I_{c,n} \\ I_{d,n} \\ M_n \end{bmatrix} = \begin{bmatrix} V_i \\ 0 \\ 0 \end{bmatrix}$$

Fig.10

| | FREQUENCY f Hz | WAVENUMBER $k=\dfrac{2\pi f}{C}$ |
|---|---|---|
| SAMPLE FREQUENCIES | f=3e+007 | k=0.628753 |
| | f=2.5e+008 | k=5.23961 |
| | f=5e+008 | k=10.4792 |
| | f=7.5e+008 | k=15.7188 |
| | f=1e+009 | k=20.9584 |
| FREQUENCY FOR APPROXIMATE CALCULATION | f=1e+008 | k=2.09584 |

Fig.12 r = 0m

| | | REAL PART | | IMAGINARY PART |
|---|---|---|---|---|
| APPROXIMATION COEFFICIENTS | | c0 = 4.412040308583569e-010<br>c1 = 1.798754920324100e-002<br>c2 = 2.158563976947456e-006<br>c3 = 2.536986022241146e-010<br>c4 = 3.141391868255842e-014 | | c1*k^2 = 7.901147831435992e-002<br>c2*k^4 = 4.164866601220040e-005<br>c3*k^6 = 2.150169278609644e-008<br>c4*k^8 = 1.169485619284607e-011 |
| | | m0 = -3.077775684696623e+004<br>m1 = 9.633050183204359e+000<br>m2 = 6.522699901706556e-004<br>m3 = 6.025880521383044e-008<br>m4 = 6.302697330212078e-012 | | m0/k = -1.468513245097980e+004<br>m1*k = 2.018937706030059e+001<br>m0*k^3 = 6.004848922503323e-003<br>m3*k^5 = 2.436778185135023e-006<br>m4*k^7 = 1.119541317378661e-009 |
| EXPONENT PART | | ejkrm = (1,0) | | |
| MOMENT METHOD (REAL PART, IMAGINARY PART) | | (7.905315245501043e-002, -1.466493706629832e+004) | | |
| APPROXIMATE VALUE (REAL PART, IMAGINARY PART) | | (7.905314895555282e-002, -1.466493706659671e+004) | | |
| ERROR (REAL PART, IMAGINARY PART) | | (-0.00000 %, 0.00000 %) | | |

Fig.13 r = 0.0001m

| | | REAL PART | | IMAGINARY PART |
|---|---|---|---|---|
| APPROXIMATION COEFFICIENTS | REAL PART | $c_0$ = 1.882208319840959e+000<br>$c_1$ = 1.738291158321004e-002<br>$c_2$ = 2.114869219239820e-006<br>$c_3$ = 2.495161976379382e-010<br>$c_4$ = 3.096309709201436e-014 | $c_1 \cdot k^2$ = 7.635556829219223e-002<br>$c_2 \cdot k^4$ = 4.080561255323416e-005<br>$c_3 \cdot k^6$ = 2.114722185984481e-008<br>$c_4 \cdot k^8$ = 1.152702314650377e-011 | |
| | IMAGINARY PART | $m_0$ = -1.882208319399799e+004<br>$m_1$ = 6.046438940327548e+000<br>$m_2$ = 4.374679626465934e-004<br>$m_3$ = 4.188420243198447e-008<br>$m_4$ = 4.515950839890369e-012 | $m_0/k$ = -8.980666982378434e+003<br>$m_1 \cdot k$ = 1.267239693728558e+001<br>$m_0 \cdot k^3$ = 4.027388657038723e-003<br>$m_3 \cdot k^5$ = 1.693736051119280e-006<br>$m_4 \cdot k^7$ = 8.021634686903196e-010 | |
| EXPONENT PART | | $e^{jkrm}$ = (1, -0.0002209584) | | |
| MOMENT METHOD (REAL PART, IMAGINARY PART) | | (7.905315176225969e-002, -8.967990769669779e+003) | | |
| APPROXIMATE VALUE (REAL PART, IMAGINARY PART) | | (7.905314826263812e-002, -8.967990769888676e+003) | | |
| ERROR (REAL PART, IMAGINARY PART) | | (-0.00000 %, 0.00000 %) | | |

Fig. 14 r = 0.001m

| | | | |
|---|---|---|---|
| APPROXIMATION COEFFICIENTS | REAL PART | c0 = 9.7960652663751e+000<br>c1 = 1.4647695872579116e-002<br>c2 = 1.8861161139757616e-006<br>c3 = 2.2607868110175466e-010<br>c4 = 2.8299675661956636e-014 | c1*k^2 = 6.4340955608510296e-002<br>c2*k^4 = 3.6391906732167096e-005<br>c3*k^6 = 1.9160824316412966e-008<br>c4*k^8 = 1.0535477617904586e-011 |
| | IMAGINARY PART | m0 = -9.7960652659331906e+003<br>m1 = 3.3431186831589326e+000<br>m2 = 2.7673128325432516e-004<br>m3 = 2.8144517910420316e-008<br>m4 = 3.1829641572871636e-012 | m0/k = -4.6704160231552e+003<br>m1*k = 7.0066575350464066e+000<br>m0*k^3 = 2.5476252580502376e-003<br>m3*k^5 = 1.1381232507304666e-006<br>m4*k^7 = 5.6538648440832326e-010 |
| EXPONENT PART | | ejkrm = (0.999998, -0.002009584) | |
| MOMENT METHOD (REAL PART, IMAGINARY PART) | | | (7.9053083004986046e-002, -4.6670428116802526e+003) |
| APPROXIMATE VALUE (REAL PART, IMAGINARY PART) | | | (7.9053079497494906e-002, -4.6670428118399876e+003) |
| ERROR (REAL PART, IMAGINARY PART) | | | (-0.00000 %, 0.00000 %) |

Fig.15 r = 0.01m

| | | | |
|---|---|---|---|
| APPROXIMATION COEFFICIENTS | REAL PART | c0 = 2.2013632348332243e+001<br>c1 = 7.2572752323398106e-003<br>c2 = 1.0220340992337979e-006<br>c3 = 1.2503159088826779e-010<br>c4 = 1.5770102711803222e-014 | c1*k^2 = 3.1878052877967781e-002<br>c2*k^4 = 1.9719766636217414e-005<br>c3*k^6 = 1.0596790176484820e-008<br>c4*k^8 = 5.8709352763222238e-012 |
| | IMAGINARY PART | m0 = -2.2013632347842249e+003<br>m1 = 1.1464061589868321e+000<br>m2 = 1.3233789936065461e-004<br>m3 = 1.5346651816507282e-008<br>m4 = 1.8958093651065521e-012 | m0/k = -1.0503465485240700e+003<br>m1*k = 2.4026892591497920e+000<br>m0*k^3 = 1.2183204263851310e-003<br>m3*k^5 = 6.2059621375872530e-007<br>m4*k^7 = 3.3675056930566200e-010 |
| EXPONENT PART | | ejkrm = (0.99978, -0.0209569) | |
| MOMENT METHOD (REAL PART, IMAGINARY PART) | | (7.9046207436611840e-002, -1.0481744970889370e+003) | |
| APPROXIMATE VALUE (REAL PART, IMAGINARY PART) | | (7.9046203550634210e-002, -1.0481744971896590e+003) | |
| ERROR (REAL PART, IMAGINARY PART) | | ( -0.00000 %, 0.00000 %) | |

Fig.16 r = 0.1m

| | | | |
|---|---|---|---|
| APPROXIMATION COEFFICIENTS | REAL PART | c0 = 2.062951327198163e+001<br>c1 =-2.871992103189478e-003<br>c2 =-3.979080114630688e-006<br>c3 =-2.176504092898767e-009<br>c4 =-7.868167804287443e-012 | c1*k^2 =-1.261541187274594e-002<br>c2*k^4 =-7.677486626537654e-005<br>c3*k^6 =-1.846503821037781e-007<br>c4*k^8 =-2.929182185201639e-009 |
| | IMAGINARY PART | m0 =-2.062950433998411e+002<br>m1 = 8.960154099535249e-001<br>m2 = 5.051112536215732e-004<br>m3 = 2.428907209783183e-007<br>m4 = 8.388188498657908e-010 | m0/k =-9.843050133154546e+001<br>m1*k = 1.877909137744576e+000<br>m0*k^3 = 4.650121853657927e-003<br>m3*k^5 = 9.822146458951678e-006<br>m4*k^7 = 1.489984860480682e-007 |
| EXPONENT PART | | e^jkrm = (0.978117,-0.208053) | |
| MOMENT METHOD (REAL PART, IMAGINARY PART) | | (7.860979546808622e-002,-9.872425093070460e+001) | |
| APPROXIMATE VALUE (REAL PART, IMAGINARY PART) | | (7.853910549588258e-002,-9.872461865453820e+001) | |
| ERROR (REAL PART, IMAGINARY PART) | | ( -0.08993 % , 0.00037 %) | |

Fig.17 r = 1m

| | | | |
|---|---|---|---|
| APPROXIMATION COEFFICIENTS | REAL PART | c0 = 2.696356731101072e-002<br>c1 = 4.933361287785999e-006<br>c2 = 4.668034411158281e-008<br>c3 =-1.924592410843346e-010<br>c4 = 2.400123825585841e-013 | c1*k^2 = 2.167010991895291e-005<br>c2*k^4 = 9.006798237640307e-007<br>c3*k^6 =-1.631147920943212e-008<br>c4*k^8 = 8.935244045447423e-011 |
| | IMAGINARY PART | m0 =-2.696504063671232e-002<br>m1 = 2.697411324176343e-002<br>m2 = 3.845803592028491e-006<br>m3 =-1.362733175726961e-009<br>m4 =-9.978524212922421e-013 | m0/k =-1.286595365819213e-002<br>m1*k = 5.653355196412514e-002<br>m0*k^3 = 3.540498296156757e-005<br>m3*k^5 = 5.510694184837699e-008<br>m4*k^7 =-1.772474475218713e-010 |
| EXPONENT PART | | ejkrm = (-0.501255, -0.8653) | |
| MOMENT METHOD (REAL PART, IMAGINARY PART) | | (2.428090537351224e-002, -4.525681716860142e-002) | |
| APPROXIMATE VALUE (REAL PART, IMAGINARY PART) | | (2.428931866925049e-002, -4.525745320153434e-002) | |
| ERROR (REAL PART, IMAGINARY PART) | | ( 0.03465 % , 0.00141 %) | |

Fig.18 r = 10m

| | | | |
|---|---|---|---|
| APPROXIMATION COEFFICIENTS | REAL PART | c0 = 2.698163189909766e-004<br>c1 = 4.814972253381429e-008<br>c2 = 5.179300456778176e-010<br>c3 =-2.182680609684028e-012<br>c4 = 2.743225585192656e-015 | c1*k^2 = 2.115007839499025e-007<br>c2*k^4 = 9.993266997949209e-009<br>c3*k^6 =-1.849885159325278e-010<br>c4*k^8 = 1.021255229172552e-012 |
| | IMAGINARY PART | m0 =-2.698302316183688e-005<br>m1 = 2.698125240952906e-003<br>m2 = 4.045245291426151e-007<br>m3 = 5.232981036380441e-011<br>m4 = 5.536866749833253e-015 | m0/k =-1.287453374297772e-005<br>m1*k = 5.654851455096689e-003<br>m0*k^3 = 3.724106995873941e-006<br>m3*k^5 = 2.116141199187004e-009<br>m4*k^7 = 9.835076587835843e-013 |
| EXPONENT PART | | ejkrm = (-0.512501,-0.858687) | |
| MOMENT METHOD (REAL PART, IMAGINARY PART) | | (4.709468671392880e-003,-3.125336245835664e-003) | |
| APPROXIMATE VALUE (REAL PART, IMAGINARY PART) | | (4.709495923782538e-003,-3.125305180588007e-003) | |
| ERROR (REAL PART, IMAGINARY PART) | | ( 0.00058 % , -0.00099 %) | |

CALCULATION OF ELECTROMAGNETIC FIELD INTENSITY BY MOMENT METHOD

BACKGROUND OF THE INVENTION

1. Field of the Invention

The present invention relates to an electromagnetic field intensity calculation apparatus and an electromagnetic field intensity calculation method. More particularly, the invention relates to an electromagnetic field intensity calculation apparatus and an electromagnetic field intensity calculation method that calculate the electromagnetic field intensity radiated from an electric circuit device at high speed while maintaining high accuracy.

Electromagnetic waves radiated from electric circuit devices interfere with other electromagnetic waves such as those of television and radio broadcasting, and strict regulations have come to be imposed on such radiation in various countries of the world. Examples of standards defining such regulations include the VCCI standards of Japan, the FCC standards of the U.S.A., and the VDE standards of Germany.

Various techniques such as shielding techniques and filtering techniques are used to meet these electromagnetic wave standards. When employing such techniques, it is necessary to carry out a simulation to quantitatively determine how much of the energy of the radiation the technique concerned can shield. A need therefore arises for an electromagnetic field intensity calculation apparatus that can simulate electromagnetic field intensities radiated from electric circuit devices with high accuracy.

2. Description of the Related Art

The strength of an electromagnetic field around an object of an arbitrary shape can be easily calculated using known theoretical equations, if the electric current flowing in each part of the object is known. Theoretically, this current value can be obtained by solving Maxwell's electromagnetic wave equations under given boundary conditions. However, analytical solutions for an object of an arbitrary shape under complex boundary conditions are not available yet.

The methods, for obtaining the electric current, which are used in electromagnetic field intensity calculation apparatus today, all provide approximate solutions. At present, three kinds of approximate solution methods are known: the infinitesimal loop antenna approximation method, the distributed constant transmission line approximation method, and the moment method.

The infinitesimal loop antenna approximation method is a method in which the conductor connecting between a wave source circuit and a load circuit is treated as a loop antenna and, by assuming the electric current on the loop to be flat, the electric current is determined using a calculation technique of a lumped constant circuit. Calculation by the infinitesimal loop antenna approximation method is the simplest. However, since the calculation accuracy drops significantly under conditions in which the loop dimension becomes significant compared to the wavelength of electromagnetic radiation, this method is of very little use in practice.

The distributed constant transmission line approximation method is a method in which the electric current is obtained by applying a distributed constant transmission line equation to an object that can be approximated as a one-dimensional structure. Calculation by the distributed constant transmission line approximation method is relatively simple, with the required computation time and memory capacity only increasing almost proportionally to the number of elements to be analyzed; furthermore, phenomena such as reflection and resonance of the transmission line can also be analyzed. An analysis can therefore be done with high accuracy and at high speed for objects for which one dimensional approximations are possible. However, the distributed constant transmission line approximation method has a problem in that an analysis cannot be done for objects that cannot be approximated to one-dimensional structures.

The moment method is a method of solving an integral equation derived from Maxwell's electromagnetic wave equations, and can handle three-dimensional objects of any shape. More specifically, the moment method divides an object into small elements (wires or surface patches or the like) and calculates the electric current flowing on each segment, thereby computing the electromagnetic field intensity. Since the moment method can handle three-dimensional objects of any shape, the design of electromagnetic field intensity calculation apparatus predominantly employs a configuration in which the strength of an electromagnetic field radiated from an electrical circuit device is calculated using the moment method.

Reference literature on the moment method includes the following.

H. N. Wang, J. H. Richmond and M. C. Gilreath: "Sinusoidal Reaction Formulation for Radiation and Scattering from Conducting Surface," IEEE TRANSACTIONS ANTENNAS PROPAGATION, AP-23, pp. 376–382, 1975.

In the moment method, as described for example in Japanese Patent Unexamined Publication Nos. 7-234890 and 7-302278 (U.S. Ser. No. 432,261) by the present inventor et al., a conductor constituting an electric circuit device, including a housing, cable, etc., is divided into small elements such as wires or surface patches. The mutual impedance between the elements and the self-impedance of each individual element (collectively called the mutual impedance $Z_{ij}$) are calculated using known mathematical equations from frequency values and the geometric data of the elements concerned, and the value of the mutual impedance $Z_{ij}$ thus obtained is substituted into simultaneous equations describing a boundary condition for each element. By solving the simultaneous equations, the current flowing on each element is determined, from which the electromagnetic field intensity is calculated. When it is desired to increase the accuracy by taking into account the scattering of the electromagnetic field caused by a dielectric contained in the electric circuit device, the dielectric also is divided into small elements, and the mutual admittance $Y_{ij}$ and mutual reaction $B_{ij}$ are calculated for each element in addition to the mutual impedance $Z_{ij}$; then, simultaneous equations containing a boundary condition for each element of the dielectric are solved.

In specifications defining EMC electromagnetic wave regulations, allowable values are specified for the regulated frequency range. For example, the VCCI standards, defining EMC electromagnetic wave regulations in Japan, stipulate the regulated frequency range of 30 MHz to 1 GHz and specify allowable values for that frequency range. Consider a transmission line on a printed circuit board as an example of an electric circuit device subject to the electromagnetic wave regulations. The transmission line sends an output of a driver (output circuit) to a receiver (receiving circuit). The output of the driver has a pulse-like voltage waveform. The components actually radiated from the transmission line, therefore, contain the fundamental frequency ($f_0$) component of the clock, plus its harmonic components ($f_1$, $f_2$, . . .

$f_n$, . . . ) whose frequencies are integral multiples of the fundamental frequency. As a result, in an electromagnetic field intensity calculation apparatus, calculations for the simulation of electromagnetic field intensities must be performed on all the harmonic components generated from the transmission line and falling within the regulated frequency range. An electric field spectrum is obtained as a result of such simulation. The resulting electric field spectrum is a set of electric field intensities calculated at the respective frequencies by the electromagnetic field intensity calculation apparatus using the moment method. Accordingly, to obtain the electric field spectrum, the electromagnetic field intensity calculation by the moment method has to be performed for each frequency (each of the fundamental frequency and/or harmonic frequencies). That is, the calculation process has to be repeated for each frequency. This has lead to the problem that it takes a very long time for the prior art electromagnetic field intensity calculation apparatus to determine through simulation whether the EMC electromagnetic wave specifications are satisfied or not. For the calculation of mutual impedances, in particular, there has been the problem that the calculation takes an extremely long time because the amount of calculation is enormous.

Thus the prior art electromagnetic field intensity calculation apparatus employs a method that calculates the mutual impedance for "each" frequency by carrying out known processing commonly used in the moment method for the calculation of the mutual impedance. The prior art electromagnetic field intensity calculation apparatus therefore has had the problem that processing involving a considerable amount of calculation has to be performed for each frequency. This problem becomes more serious when the mutual admittance or mutual reaction has to be obtained in addition to the mutual impedance.

An example of calculation time will be given below. The calculation time depends much on the shape of a three-dimensional object to be simulated. To give a rough value, when a three-dimensional object to be simulated was divided into elements consisting of 1000 surface patches, it took several hours to calculate the electromagnetic field intensity for each frequency. More specifically, it took several hours to calculate the mutual impedance, several minutes to calculate the simultaneous equations, and several minutes to calculate the electric field or magnetic field.

SUMMARY OF THE INVENTION

It is an object of the present invention to provide an apparatus for calculating an electromagnetic field intensity and a method of calculating the same, capable of calculating the strength of an electromagnetic field radiated from an electric circuit device at high speed while maintaining high accuracy.

According to the present invention, there is provided a method of calculating an electromagnetic field intensity, comprising the steps of: a) calculating approximation coefficients for each of approximate equations that respectively yield approximate values of electromagnetic characteristic values, between a plurality of elements constituting an electric circuit device and of the elements themselves, at an arbitrary frequency; and b) calculating the approximate values of the electromagnetic characteristic values between the elements and of the elements themselves at a designated frequency in accordance with the approximate equations having the approximation coefficients calculated in step a), thereby making it possible to evaluate the electromagnetic field intensity for the designated frequency.

According to the present invention, there is also provided an apparatus for calculating an electromagnetic field intensity, comprising: means for calculating approximation coefficients for each of approximate equations that respectively yield approximate values of electromagnetic characteristic values, between a plurality of elements constituting an electric circuit device and of the elements themselves, at an arbitrary frequency; and means for calculating the approximate values of the electromagnetic characteristic values between the elements and of the elements themselves at a designated frequency in accordance with the approximate equations having the approximation coefficients calculated by the approximation coefficients calculating means, thereby making it possible to evaluate the electromagnetic field intensity for the designated frequency.

According to the present invention, there is also provided a program storage device readable by a machine, tangibly embodying a program of instructions executable by the machine to perform method steps for calculating an electromagnetic field intensity, the method steps comprising: a) calculating approximation coefficients for each of approximate equations that respectively yield approximate values of electromagnetic characteristic values, between a plurality of elements constituting an electric circuit device and of the elements themselves, at an arbitrary frequency; and b) calculating the approximate values of the electromagnetic characteristic values between the elements and of the elements themselves at a designated frequency in accordance with the approximate equations having the approximation coefficients calculated in step a), thereby making it possible to evaluate the electromagnetic field intensity for the designated frequency.

BRIEF DESCRIPTION OF THE DRAWINGS

FIG. 5 is a diagram showing simultaneous equations accounting for the effect of scattering caused by dielectrics;

FIG. 6 is a diagram showing simultaneous equations further accounting for the presence of a core inserted in a cable;

FIG. 7 is a diagram showing a matrix equation for a physical object;

FIG. 8 is a diagram showing a matrix equation for a mirror image;

FIG. 9 is a diagram showing simultaneous equations accounting for reflected waves;

FIG. 10 is a diagram showing sample frequencies for approximate calculations of impedance and a frequency for approximate calculation;

FIGS. 12 to 18 are diagram showing results of the comparison test; and

DESCRIPTION OF THE PREFERRED EMBODIMENTS

Figure 1:
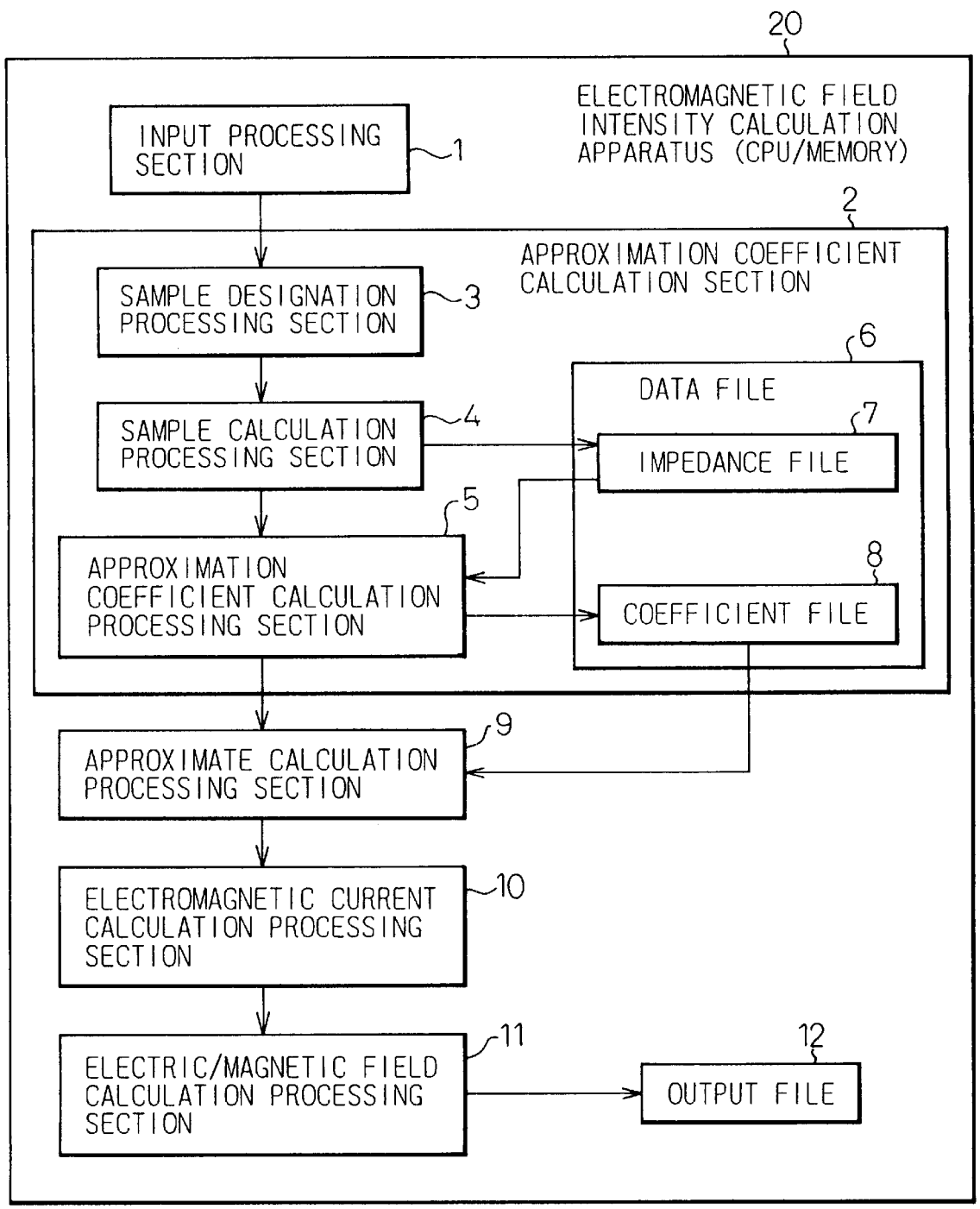
FIG. 1 is a block diagram of an electromagnetic field intensity calculation apparatus according to the present invention.

FIG. 1 shows the configuration of an electromagnetic field intensity calculation apparatus 20. The electromagnetic field intensity calculation apparatus 20 obtains mutual impedances, etc. using approximate equations, and by using the obtained results, solves simultaneous equations of the moment method and thereby computes the strength of an electromagnetic field radiated from an electric circuit device to be analyzed. The electromagnetic field intensity calculation apparatus 20 comprises a CPU, memory, and electromagnetic field intensity calculation programs stored in the memory. The electromagnetic field intensity calculation programs may be provided on a known storage medium such as a flexible disk or a CD-ROM.

When the electromagnetic field intensity calculation apparatus 20 is activated, an input processing section 1 reads structural information stored in an input file located outside the figure. The structural information is needed to apply the moment method to the electric circuit device for which a simulation is to be performed, and is used to divide the electric circuit device into a plurality of elements (surface patches or wires).

Various data necessary for electromagnetic field intensity calculations are input to the input processing section 1 from outside the electromagnetic field intensity calculation apparatus 20. When a frequency range and frequencies to be simulated (analyzed) are input, these are stored in a memory located outside the figure by the input processing section 1.

The frequency range defines a simulation range. For example, when carrying out an analysis to determine whether the electric circuit device to be analyzed satisfies the VCCI specifications, the frequency range is set equal to the control frequency range of 30 MHz to 1 GHz. The frequency range can also be set to define any desired simulation range, regardless of the EMC electromagnetic wave regulation specifications.

The frequencies to be simulated are the frequencies at which the electric field and magnetic field intensities are to be calculated. For example, frequencies falling within the input frequency range and equal to integral multiples of the fundamental clock frequency of the electric circuit device to be analyzed are input as the frequencies to be simulated.

Usually, there are many frequencies to be simulated within the input frequency range. First, the fundamental clock frequency of the electric circuit device to be analyzed, for example, is input to the input processing section 1. Then, based on this fundamental clock frequency, the input processing section 1 calculates all the frequencies that are equal to integral multiples of the fundamental clock frequency and that fall within the frequency range. These frequencies are the frequencies to be simulated, and the mutual impedance at each frequency is obtained using an approximate equation of the present invention. The input processing section 1 stores the thus calculated frequencies to be simulated into the memory located outside the figure. Alternatively, the frequencies to be simulated may be designated specifically and input directly to the input processing section 1, as previously described.

A sample designation processing section 3, a sample calculation processing section 4, and an approximation coefficient calculation processing section 5 together constitute an approximation coefficient calculation section 2. The approximation coefficient calculation section 2 contains a data file 6 which consists of an impedance file 7 for storing mutual impedances and a coefficient file 8 for storing approximation coefficients.

The sample designation processing section 3 determines sample frequencies based on the frequency range and the number of samples, n. For this purpose, the sample designation processing section 3 refers to the frequency range stored in the memory. The sample frequencies are samples used for the calculation of approximation coefficients. A plurality of such sample frequencies (n sample frequencies) are designated. The value n is determined according to the accuracy of the approximate equation used by an approximate calculation processing section 9, as will be described later. More specifically, n is set to a value not smaller than the number of terms in the real and the imaginary part of the approximate equation, and preferably to a value equal to the number of terms. The following description deals with a case in which n is chosen to be equal to the number of terms in the real and the imaginary part of the approximate equation. The sample designation processing section 3 stores the thus determined sample frequencies in the memory located outside the figure.

The sample frequencies are designated at substantially equispaced frequency intervals with spacing chosen to be equal to the width of the frequency range divided by (n−1). For example, when the frequency range is from 30 MHz to 1 GHz and n=5, five sample frequencies, $f_{s1}$, $f_{s2}$, $f_{s3}$, $f_{s4}$, and $f_{s5}$, are chosen as specific numerical values. In this example, the sample frequencies, $f_{s1}$, $f_{s2}$, $f_{s3}$, $f_{s4}$, and $f_{s5}$, are chosen as 30 MHz, 250 MHz, 500 MHz, and 750 MHz, respectively. The lowest sample frequency $f_{s1}$ is not 0 MHz, which would be the value if chosen at strictly equispaced intervals, but is chosen as 30 MHz, the smallest value of the control frequency range. However, equispacing the sample frequencies is not strictly demanded. After all, it is only necessary to construct simultaneous equations for obtaining approximation coefficients, and if the spacing is somewhat unequal, it will not present a problem in processing.

The sample calculation processing section 4 calculates electromagnetic characteristic values, such as the mutual impedance, mutual admittance, and mutual reaction, at n sample frequencies. For this purpose, the sample calculation processing section 4 refers to the n sample frequencies stored in the memory. As previously described, when calculating the electromagnetic field intensity without considering the effect of the electromagnetic field scattering caused by the dielectrics, mutual impedances only for the elements of the conductor (metal) are calculated, and when the effect is to be considered, mutual impedances, mutual admittances, and mutual reactions are calculated for all the elements including the elements of the dielectrics. The mutual impedance, etc. are calculated from the geometric data of the elements concerned and frequency values, without using approximate equations, but by using known mathematical equations commonly used in the moment method. The values of the calculated mutual impedance, etc. are therefore exact values.

When only the mutual impedance $Z_{ij}$ is to be calculated, a number, n, of mutual impedances $Z_{ij}$, equal to the number of sample frequencies, are calculated for each pair of elements determined by the values of i and j. The sample calculation processing section 4 stores the calculated mutual impedance values in the impedance file 7. When the mutual admittance and mutual reaction are calculated, these also are stored in the file 7.

When n=5 with five sample frequencies designated as $f_{s1}$, $f_{s2}$, $f_{s3}$, $f_{s4}$, and $f_{s5}$, for example, the mutual impedances $Z_{ij,s1}$ to $Z_{ij,s5}$ are obtained for the respective sample frequencies of $f_{s1}$ to $f_{s5}$. Thus, specific values of mutual impedances $Z_{ij,s1}$ to $Z_{ij,s5}$ are obtained for each pair of elements determined by the values of i and j. These mutual impedances $Z_{ij,s1}$ to $Z_{ij,s5}$ are expressed as follows:

$$Z_{ij,s1}=\alpha_{ij,s1}+j\beta_{ij,s1} \quad (1)$$

$$Z_{ij,s2}=\alpha_{ij,s2}+j\beta_{ij,s2}$$

$$Z_{ij,s3}=\alpha_{ij,s3}+j\beta_{ij,s3}$$

$$Z_{ij,s4}=\alpha_{ij,s4}+j\beta_{ij,s4}$$

$$Z_{ij,s5}=\alpha_{ij,s5}+j\beta_{ij,s5}$$

where $\alpha_{ij}$ is the value of the real part of the mutual impedance $Z_{ij}$, $\beta_{ij}$ is the value of the imaginary part of the mutual impedance $Z_{ij}$, and i and j, the subscripts on $\alpha$ and $\beta$, each take a value between 1 and m and denote the number of modes of the moment method. Further, j prefixed to $\beta$ is the imaginary unit and is distinguished from the j written subscript to $\beta$. Thus, five sets of real part $\alpha_{ij}$ and imaginary part $\beta_{ij}$ are respectively obtained as specific numeric values.

Using the n sets of mutual impedances, etc. calculated by the sample calculation processing section 4 and the n sample frequencies designated by the sample designation processing section 3, the approximation coefficient calculation processing section 5 calculates approximation coefficients in accordance with the approximate equations of the present invention. For this purpose, the approximation coefficient calculation processing section 5 refers to the n sets of mutual impedances, etc. and the n sample frequencies stored in the memory.

According to the present invention, the approximate equation for the mutual impedance $Z_{ij}$ is $$Z_{ij}=\exp(-jkr)[a_0+a_1f^2+a_2f^4+a_3f^6+a_4f^8+\ldots+j(b_0/f+b_1f+b_2f^3+b_3f^5+b_4f^7+\ldots)]$$

where f is the frequency, $a_0$, $a_i$, ... are approximation coefficients for the real part, and $b_0$, $b_1$, ... are approximation coefficients for the imaginary part. Further, j is the imaginary unit, k is a value determined by $k=2\pi f/c$, and r is the distance between the centers of two elements. Needless to say, the term "$a_0$" is actually the term "$a_0 \times f^0 = a_0$", and the term "$b_0/f$" is actually the term "$b_0 \times f^{-1}$". Accordingly, the real part is a sum of the terms with the frequency raised to an even-numbered power (0, 2, 4, 6, 8, ...) and multiplied by the respective approximation coefficients, and the imaginary part is a sum of the terms with the frequency raised to an odd-numbered power (−1, 1, 3, 5, 7, ...) and multiplied by the respective approximation coefficients.

The approximate equation for the mutual admittance $Y_{ij}$ is $$Y_{ij}=\exp(-jkr)[a_0+a_1f^2+a_2f^4+a_3f^6+a_4f^8+\ldots+j(b_0/f+b_1f+b_2f^3+b_3f^5+b_4f^7+\ldots)]$$

which is of the same form as that for the mutual impedance.

The approximate equation for the mutual reaction $B_{ij}$ is $$B_{ij}=\exp(-jkr)[c_0+c_1f^2+c_2f^4+c_3f^6+c_4f^8+\ldots+j(d_0f+d_1f^3+d_2f^5+d_3f^7+d_4f^9+\ldots)]$$

where $c_0$, $c_1$, ... are approximation coefficients for the real part, and $d_0$, $d_1$, ... are approximation coefficients for the imaginary part. This equation is similar in form to that for the mutual impedance, the difference being that the first term of the imaginary part begins with the 1st power of the frequency f instead of the −1st power of the frequency f.

How the mutual impedance, etc. can be approximated using the above approximate equations will be explained later.

The approximate equations are given in advance to the approximation coefficient calculation processing section 5 in the form of a program. At the same time, the number, n, of terms in the real and the imaginary part (hence the number, n, of samples) is determined. For example, when n=5, the approximate equation for the mutual impedance $Z_{ij}$ is given as $$Z_{ij}=\exp(-jkr)[a_0+a_1f^2+a_2f^4+a_3f^6+a_4f^8+j(b_0/f+b_1f+b_2f^3+b_3f^5+b_4f^7)]$$

Likewise, the approximate equation for the mutual admittance $Y_{ij}$ is given as $$Y_{ij}=\exp(-jkr)[a_0+a_1f^2+a_2f^4+a_3f^6+a_4f^8+j(b_0/f+b_1f+b_2f^3+b_3f^5+b_4f^7)]$$

The approximate equation for the mutual reaction $B_{ij}$ is given as $$B_{ij}=\exp(-jkr)[c_0+c_1f^2+c_2f^4+c_3f^6+c_4f^8+j(d_0f+d_1f^3+d_2f^5+d_3f^7+d_4f^9)]$$

Provisions may be made so that the number, n, of terms in the approximate equations (hence the number, n, of samples) can be specified or changed by an input from the input processing section 1. It is generally believed that the accuracy of approximation depends on the number of terms, n, in an approximate equation. Therefore, the form of the approximate equation, that is, the number of terms, n, in the approximate equation, may be changed according to the situation; that is, when the accuracy of approximation is not an important concern, the number of terms, n, can be reduced to speed up the calculation of electric fields, etc., and when the processing time is not an important concern, the number of terms, n, is increased so that electric fields, etc. can be obtained with higher accuracy.

For the calculation of the approximation coefficients, the approximation coefficient calculation processing section 5 reads out the n sets of mutual impedances, etc. stored in the impedance file 7, but after they have been read out, the impedance file 7 is no longer necessary. Accordingly, the approximation coefficient calculation processing section 5 stores the calculated approximation coefficients in the file used as the impedance file 7. More specifically, the impedance file 7 is now used as the coefficient file 8. That is, the same file is used as the impedance file 7 at one time and as the coefficient file 8 at other times. Since the data amount of the mutual impedance, etc. and approximation coefficients to be stored in a file is large, memory resources can be used effectively by sharing the same file in this manner.

For example, when n=5 has been given and five sets of mutual impedances $Z_{ij,s1}$ to $Z_{ij,s5}$ have been obtained for five sample frequencies $f_{s1}$ to $f_{s5}$, the approximation coefficient calculation processing section 5 constructs five simultaneous equations for the real part by substituting the five values of the real part $\alpha'_{ij}$ and the five sample frequencies into the real part of the approximate equation. These simultaneous equations are for (the real part $\alpha'_{ij}$ of) the mutual impedance $Z_{ij}$ between the two elements determined by the values of the subscripts i and j. The simultaneous equations are expressed as $$\alpha'_{ij,s1}=a_0+a_1f_{s1}^2+a_2f_{s1}^4+a_3f_{s1}^6+a_4f_{s1}^8 \quad (2)$$

$$\alpha'_{ij,s2}=a_0+a_1f_{s2}^2+a_2f_{s2}^4+a_3f_{s2}^6+a_4f_{s2}^8$$

$$\alpha'_{ij,s3}=a_0+a_1f_{s3}^2+a_2f_{s3}^4+a_3f_{s3}^6+a_4f_{s3}^8$$

$$\alpha'_{ij,s4}=a_0+a_1f_{s4}^2+a_2f_{s44}+a_3f_{s4}^6+a_4f_{s4}^8$$

$$\alpha'_{ij,s5}=a_0+a_1f_{s5}^2+a_2f_{s5}^4+a_3f_{s5}^6+a_4f_{s5}^8$$

In the above simultaneous equations, the values of the real parts $\alpha'_{ij,s1}$ to $\alpha'_{ij,s5}$ of the mutual impedances are calculated from the following equations by using the $Z_{ij,s1}$ to $Z_{ij,s5}$ calculated in the sample calculation processing section 4.

$$Z_{ij,s1}/\exp[-j(2\pi f_{s1}/c)r]=\alpha'_{ij,s1}+j\beta'_{ij,s1} \quad (3)$$

$$Z_{ij,s2}/\exp[-j(2\pi f_{s2}/c)r]=\alpha'_{ij,s2}+j\beta'_{ij,s2}$$

$$Z_{ij,s3}/\exp[-j(2\pi f_{s3}/c)r]=\alpha'_{ij,s3}+j\beta'_{ij,s3}$$

$$Z_{ij,s4}/\exp[-j(2\pi f_{s4}/c)r]=\alpha'_{ij,s4}+j\beta'_{ij,s4}$$

$$Z_{ij,s5}/\exp[-j(2\pi f_{s5}/c)r]=\alpha'_{ij,s5}+j\beta'_{ij,s5}$$

Here, the values of the sample frequencies $f_{s1}$ to $f_{s5}$ are already designated. Further, the distance r between the centers of the two elements determined by the values of i and j is a known value. Therefore, the value of the left-hand side of each equation (3) can be calculated, and by substituting the resulting values of the real parts $\alpha'_{ij,s1}$ to $\alpha'_{ij,s5}$ in equations (2), the five simultaneous equations are solved for the five unknowns $a_0$ to $a_4$, to obtain the values of the approximation coefficients $a_0$ to $a_4$. These approximation coefficients $a_0$ to $a_4$ are used in the approximate equation expressing (the real part of) the mutual impedance $Z_{ij}$, at designated frequency f, between the two elements determined by the values of i and j.

In like manner, the approximation coefficient calculation processing section 5 constructs five simultaneous equations for the imaginary part by substituting the five values of the imaginary part $\beta'_{ij}$ and the five sample frequencies into the imaginary part of the approximate equation. These simultaneous equations are for the imaginary part $\beta'_{ij}$ of the mutual impedance $Z_{ij}$ between the two elements determined by the values of i and j. The simultaneous equations are expressed as $$\beta'_{ij,s1}=b_0/f_{s1}+b_1 f_{s1}+b_2 f_{s1}^3+b_3 f_{s1}^5+b_4 f_{s1}^7 \quad (4)$$

$$\beta'_{ij,s2}=b_0/f_{s2}+b_1 f_{s2}+b_2 f_{s2}^3+b_3 f_{s2}^5+b_4 f_{s2}^7$$

$$\beta'_{ij,s3}=b_0/f_{s3}+b_1 f_{s3}+b_2 f_{s3}^3+b_3 f_{s3}^5+b_4 f_{s3}^7$$

$$\beta'_{ij,s4}=b_0/f_{s4}+b_1 f_{s4}+b_2 f_{s4}^3+b_3 f_{s4}^5+b_4 f_{s4}^7$$

$$\alpha'_{ij,s5}=b_0/f_{s5}+b_1 f_{s5}+b_2 f_{s5}^3+b_3 f_{s5}^5+b_4 f_{s5}^7$$

These simultaneous equations are solved to obtain the values of the approximation coefficients $b_0$ to $b_4$. These approximation coefficients $b_0$ to $b_4$ are used in the approximate equation expressing the imaginary part of the mutual impedance $Z_{ij}$, at designated frequency f, between the two elements determined by the values of i and j. The simultaneous equations (2) and (4) can be solved, for example, by the known method of Gaussian elimination, but the solutions can be obtained much faster by using the method of LU decomposition. Details of the LU decomposition method will be described later.

The processing in the approximation coefficient calculation section 2 has been described above. The processing performed in the approximation coefficient calculation section 2 is to calculate the approximation coefficients used in the approximate equations for the mutual impedance, etc. and thereby complete the approximate equations. This processing is actually preprocessing preparatory to the calculation of the mutual impedance, etc. by approximation. This processing is performed only once for one set of n sample frequencies. In the approximation coefficient calculation section 2, the processing for the calculation of the mutual impedance, etc. is performed by using known methods without using approximate equations. However, since this processing is performed only for a limited number of mutual impedances, etc. for each attention element pair, this processing does not have a significant influence on the total processing time.

On the other hand, the actual calculation process for the mutual impedance, etc. is performed in the approximate calculation processing section 9. The calculation process uses approximate equations of simple form and performs calculations by approximation. Accordingly, the time required to calculate the mutual impedance at one frequency is extremely short. This calculation processing is repeated for each designated frequency within the specified frequency range (for example, 98 frequencies as will be described later). However, since the processing time for one frequency is extremely short, the total processing time can be reduced drastically.

Using the plurality of approximation coefficients calculated by the approximation coefficient calculation processing section 5, the approximate calculation processing section 9 calculates the approximate values of the mutual impedance, etc. for the designated frequencies within the frequency range in accordance with the previously given approximate equations. For this purpose, the approximate calculation processing section 9 refers to the coefficient file 8. In the previously given approximate equations, values other than the frequency f are already determined. Therefore, by substituting a designated frequency into the approximate equations, the mutual impedance, etc. at that frequency can be calculated. The approximate calculation processing section 9 stores the calculated mutual impedance, etc. at designated locations in the memory.

When n=5, for example, the approximate equation for the mutual impedance $Z_{ij}$ is given as $$Z_{ij}=\exp[-j(2\pi f/c)r)][a_0+a_1 f^2+a_2 f^4+a_3 f^6+a_4 f^8+j(b_0/f+b_1 f+b_2 f^3+b_3 f^5+b_4 f^7)]$$

In this approximate equation, the distance r between the centers of two elements and the approximation coefficients $a_0$ to $a_4$ and $b_0$ to $b_4$ are known values. Then, by substituting frequency f into the approximate equation, the mutual impedance $Z_{ij}$ at that frequency can be calculated.

Using this approximate equation, calculation of the mutual impedance is repeated for each designated frequency within the frequency range. For example, when the fundamental clock frequency of an electric circuit device is 10 MHz and the frequency range is from 30 MHz to 1 GHz, the mutual impedance is obtained for each of the harmonic components of the fundamental frequency of 10 MHz. Since a harmonic has a frequency that is an integral multiple of the fundamental frequency, the harmonic frequencies falling within the frequency range of 30 MHz to 1 GHz are 30 MHz, 40 MHz, 50 MHz, . . . , 990 MHz, and 1 GHz. That is, there are 98 harmonic components within the frequency range. The mutual impedance at each of the 98 harmonic components is calculated using the approximate equation, rather than an exact equation as used in the prior art.

Using the electromagnetic field intensity calculation apparatus 20, only mutual impedances may be calculated if the role of evaluating the electromagnetic field intensity generated by an electric circuit device is left to other means. In other words, the electromagnetic field intensity calculation apparatus 20 can be used as a mutual impedance calculation apparatus. In that case, the processing in the electromagnetic current calculation processing section 10 and electric/magnetic field calculation processing section 11 is omitted, and only the mutual impedances calculated in the approximate calculation processing section 9 are output. In like manner, only mutual admittances or mutual reactions may be calculated.

The electromagnetic current calculation processing section 10 substitutes the approximate values of the mutual impedance calculated by the approximate calculation processing section 9 into simultaneous equations of the moment method expressing a boundary condition for each element, and calculates the value of the current flowing on each element by solving the simultaneous equations. For this purpose, the electromagnetic current calculation processing section 10 refers to the approximate values of the mutual impedance that the approximate calculation processing section 9 has stored in the memory. The electromagnetic current calculation processing section 10 stores the calculated current values at designated locations in the memory.

The simultaneous equations of the moment method for the mutual impedance $Z_{ij}$, when the effect of the dielectrics is not taken into account, are given by $[Z_{ij}][I_i]=[V_i]$, where [ ] represents a vector or matrix. The earlier calculated mutual impedances $Z_{ij}$ are substituted into this matrix equation. Since wave source $[V_i]$ is known, the value of the current $[I_i]$ flowing on each element is obtained. The calculation of the current value $[I_i]$ is repeated for each of the designated frequencies within the frequency range.

The electric/magnetic field calculation processing section 11, using the electric current values calculated by the electromagnetic current calculation processing section 10, performs prescribed calculations to calculate electric field E and magnetic field H. For this purpose, the electric/magnetic field calculation processing section 11 refers to the values that the electromagnetic current calculation processing section 10 has stored in the memory. The electric/magnetic field calculation processing section 11 stores the calculated electric field E and magnetic field H in the output file 12. In this way, the electromagnetic field intensity radiated from the electric circuit device is calculated.

When taking into account the effect of the electromagnetic field scattering caused by the dielectrics contained in the electric circuit device, the electromagnetic current calculation processing section 10 substitutes the values of the mutual impedance, mutual admittance, and mutual reaction, calculated by the approximate calculation processing section 9, into simultaneous equations of the moment method containing a boundary condition for each element of the dielectric, and by solving the simultaneous equations, calculates the equivalent electric current and equivalent magnetic current flowing on each element of the dielectric together with the electric current flowing on each element of the conductor. From the obtained results, the electric/magnetic field calculation processing section 11 calculates the electromagnetic field intensity. The simultaneous equations used for the calculation will be described later.

Figure 2:
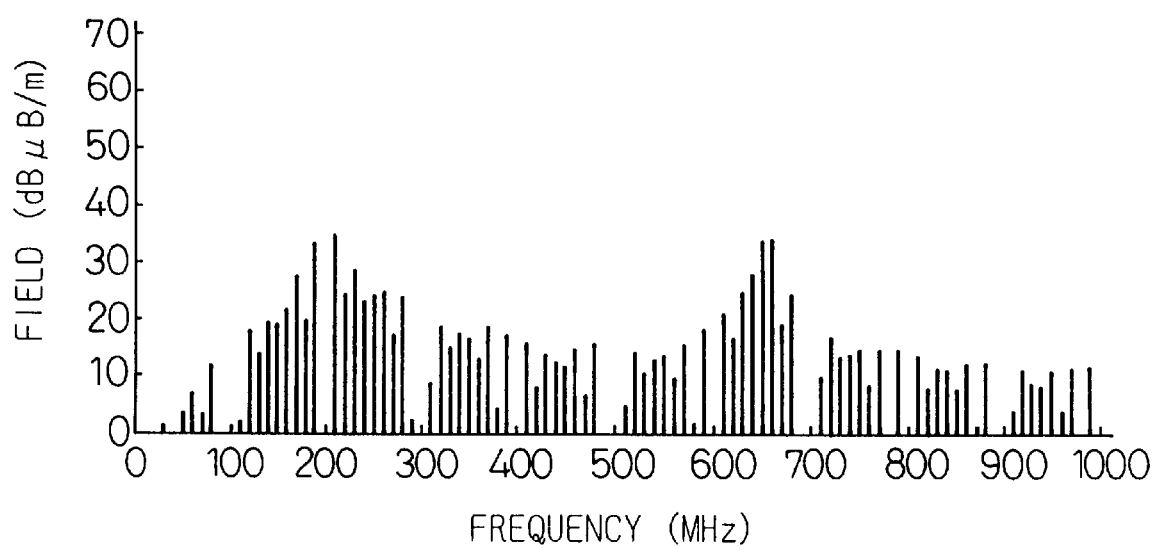
FIG. 2 is a diagram showing an example of a frequency spectrum of electromagnetic field intensities, output from the electromagnetic field intensity calculation apparatus.

After that, based on the data of the electric field E and magnetic field H stored in the output file 12, an output processing section, which is located outside the figure, creates a frequency spectrum for output in the form of a graph which plots the frequency distribution of the electromagnetic field intensity, as shown in FIG. 2. Alternatively, the output processing section may be constructed to output the frequency distribution of the electromagnetic field intensity in other form, based on the data of the electric field E and magnetic field H stored in the output file 12.

Process Flow for Electromagnetic Field Intensity Calculation

Figure 3:
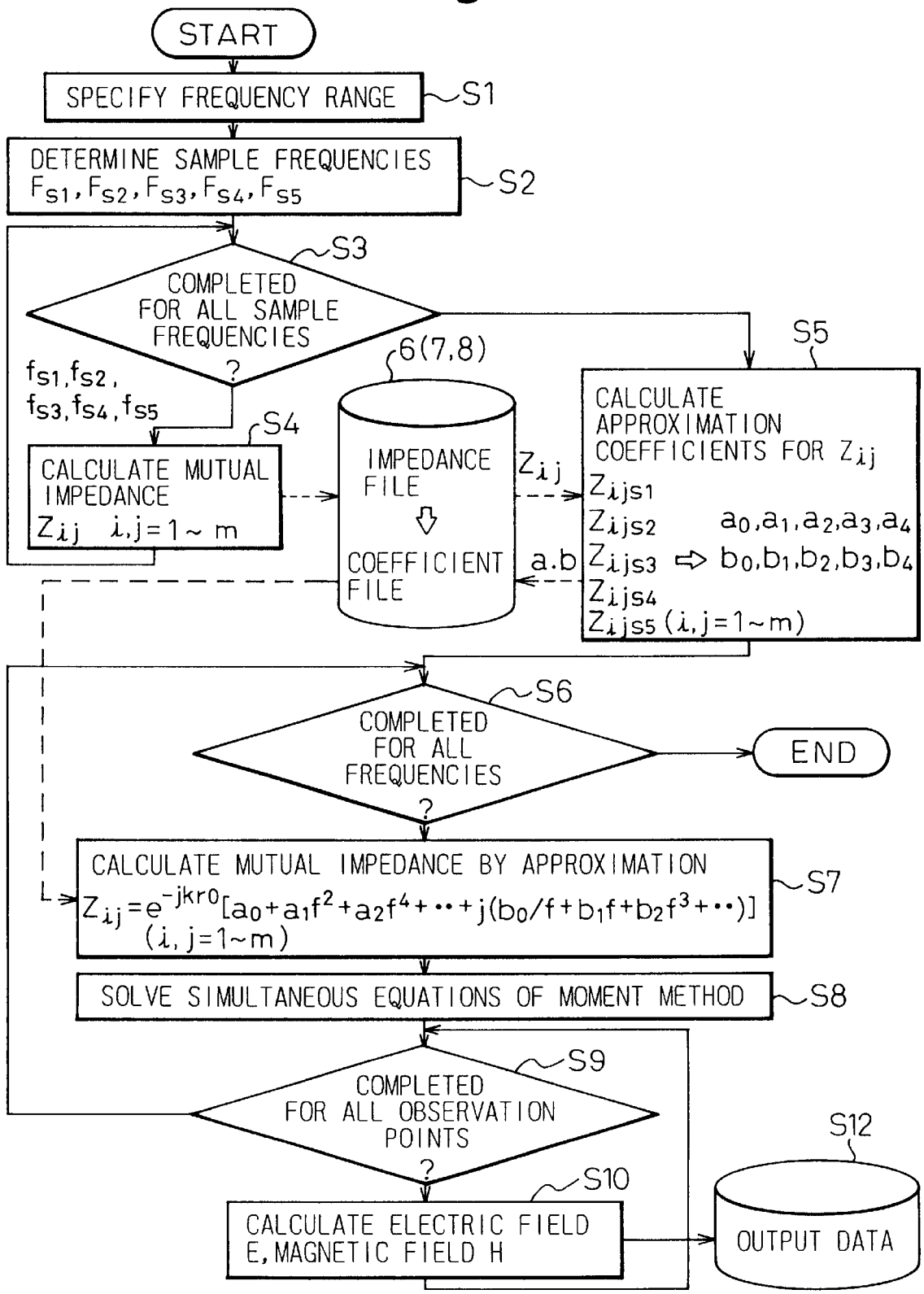
FIG. 3 is a flowchart illustrating the operation of the electromagnetic field intensity calculation apparatus.

FIG. 3 shows a process flow for the electromagnetic field intensity calculation performed in the electromagnetic field intensity calculation apparatus 20. This process flow shows an example where mutual impedances are calculated first, and then the electromagnetic field intensity is computed using the mutual impedances. Fundamentally the same process applies for cases where mutual admittances and mutual reactions are calculated along with mutual impedances.

When the electromagnetic field intensity calculation apparatus 20 is activated, the input processing section 1 reads the structural information. After that, when a frequency range is specified and entered from the outside, the input processing section 1 obtains the frequency range (S1). Then the sample designation processing section 3 determines a plurality of sample frequencies (S2), based on the frequency range and on the number of terms, n, in the real and the imaginary part of the approximate equation to be used in the approximate calculation processing section 9. The sample calculation processing section 4 examines whether the calculation of the mutual impedance $Z_{ij}$ has been completed for all of the designated sample frequencies (S3). If it has not been completed yet, the sample calculation processing section 4 calculates the mutual impedance $Z_{ij}$ at the next sample frequency remaining unprocessed, by performing known calculations used in the moment method (S4). The process then returns to step S3.

When the calculation has been completed for all the sample frequencies, the approximation coefficient calculation processing section 5 constructs simultaneous equations by substituting each sample frequency and its corresponding mutual impedance $Z_{ij}$ into the real and imaginary parts of the approximate equation to be used in the approximate calculation processing section 9, and calculates the approximation coefficients by solving the simultaneous equations (S5). This completes the preprocessing, which is followed by a process in which approximate calculation of the mutual impedance $Z_{ij}$ for each frequency and the calculation of the electric current value using the same are repeated to calculate the electric and magnetic fields.

First, the approximate calculation processing section 9 examines whether the calculation of the mutual impedance $Z_{ij}$ has been completed for all the frequencies within the specified frequency range (S6). If completed, the electromagnetic field intensity calculation process is terminated. Thereafter, the electric field spectrum is output. If not completed yet, the approximate calculation processing section 9 calculates the approximate value of the mutual impedance $Z_{ij}$ for one frequency in accordance with the approximate equation (S7). The electromagnetic current calculation processing section 10 substitutes the approximate value of the mutual impedance $Z_{ij}$ into the simultaneous equations of the moment method, and calculates the electric current value by solving the simultaneous equations (S8). The electric/magnetic field calculation processing section 11 examines whether the calculation of the electric current has been completed for all the observation points (S9). If completed, the process returns to step S6. If not completed yet, the electric/magnetic field calculation processing section 11 calculates the electric field E and magnetic field H for the next observation point remaining unprocessed, and stores the results in the output file 12 (S10). After that, the process returns to step S9.

Speeding the Calculation of Approximation Coefficients by LU Decomposition Method When directly solving the simultaneous equations (2), (4) by Gaussian elimination or the like, since the values of the real parts $\alpha'_{ij,s1}$ to $\alpha'_{ij,s5}$ vary with the values of i and j, the process for calculating the approximation coefficients $a_0$ to $a_4$ by solving the simultaneous equations must be repeated the same number of times as the number of possible combinations of i and j values. On the other hand, when solving the simultaneous equations by the LU decomposition method, though the values of the real parts $\alpha'_{ij,s1}$ to $\alpha'_{ij,s5}$ vary with the values of i and j, part of the process for solving the simultaneous equations can be made common to any combination of i and j values, and furthermore, the remaining part of the solving process can be made relatively simple. Accordingly, the approximation coefficients can be calculated at high speed by repeating only the remaining part of the solving process in accordance with the variation of the i and j values.

The reason that the approximation coefficients for the approximate equations for the mutual impedance $Z_{ij}$, etc. can be calculated using the LU decomposition method will be explained below. The following explanation deals with the calculation of the approximation coefficients $a_0$ to $a_4$ for the real parts $\alpha'_{ij,s1}$ to $\alpha'_{ij,s5}$ of the mutual impedance $Z_{ij}$.

In equation (2), the real parts $\alpha'_{ij,s1}$ to $\alpha'_{ij,s5}$ vary with the values of i and j. The sample frequencies $f_{s1}$ to $f_{s5}$ are fixed values. The five approximation coefficients $a_0$ to $a_4$ are unknowns. Accordingly, the right-hand side of equation (2) takes the form of the unknowns, $a_0$ to $a_4$, respectively multiplied by the coefficients $f_{s1}^0$ to $f_{s5}^8$, etc., and the left-hand side of equation (2) can be regarded as variables, $\alpha'_{ij,s1}$ to $\alpha'_{ij,s5}$, whose values vary with the values of i and j.

When equation (2) is seen from such a viewpoint, it is found that the right-hand side, excluding the unknowns $a_0$ to $a_4$, does not change even if the values of i and j change. In other words, even when the values of the real parts $\alpha'_{ij,s1}$ to $\alpha'_{ij,s5}$ of the mutual impedance $Z_{ij}$ change as a result of a change in the values of i and j, the 5×5 coefficient matrix consisting of the coefficients $f_{s1}^0$ to $f_{s5}^8$, etc. on the right-hand side remains unchanged. In equation (2), those values that change according to the values of i and j are the unknowns on the right-hand side and the constant term on the left-hand side.

Noting that the coefficient matrix on the right-hand side of equation (2) does not change with the values of i and j, the LU decomposition method can be applied to the solution of equation (2) as the simultaneous equations. That is, according to the LU decomposition method, the 5×5 coefficient matrix consisting of the coefficients $f_{s1}^0$ to $f_{s5}^8$, etc. on the right-hand side is decomposed as a product of a lower triangular matrix L, with the leading diagonal elements consisting of 1, and an upper triangular matrix U, as shown in equation (5) below.

$$\begin{bmatrix} 1 & f_{s1}^2 & f_{s1}^4 & f_{s1}^6 & f_{s1}^8 \\ 1 & f_{s2}^2 & f_{s2}^4 & f_{s2}^6 & f_{s2}^8 \\ 1 & f_{s3}^2 & f_{s3}^4 & f_{s3}^6 & f_{s3}^8 \\ 1 & f_{s4}^2 & f_{s4}^4 & f_{s4}^6 & f_{s4}^8 \\ 1 & f_{s5}^2 & f_{s5}^4 & f_{s5}^6 & f_{s5}^8 \end{bmatrix} = \begin{bmatrix} 1 & 0 & 0 & 0 & 0 \\ L_{21} & 1 & 0 & 0 & 0 \\ L_{31} & L_{32} & 1 & 0 & 0 \\ L_{41} & L_{42} & L_{43} & 1 & 0 \\ L_{51} & L_{52} & L_{53} & L_{54} & 1 \end{bmatrix} \begin{bmatrix} U_{11} & U_{12} & U_{13} & U_{14} & U_{15} \\ 0 & U_{12} & U_{23} & U_{24} & U_{25} \\ 0 & 0 & U_{33} & U_{34} & U_{35} \\ 0 & 0 & 0 & U_{44} & U_{45} \\ 0 & 0 & 0 & 0 & U_{55} \end{bmatrix} \quad (5)$$

Here, for the convenience of expressing equation (6) given hereinafter, the coefficient matrix (the 5×5 coefficient matrix consisting of the coefficients $f_{s1}^0$ to $f_{s5}^8$, etc.) on the left-hand side of equation (5) is set as follows:

$$\begin{bmatrix} C_{11} & C_{12} & C_{13} & C_{14} & C_{15} \\ C_{21} & C_{22} & C_{23} & C_{24} & C_{25} \\ C_{31} & C_{32} & C_{33} & C_{34} & C_{35} \\ C_{41} & C_{42} & C_{43} & C_{44} & C_{45} \\ C_{51} & C_{52} & C_{53} & C_{54} & C_{55} \end{bmatrix} = \begin{bmatrix} 1 & f_{s1}^2 & f_{s1}^4 & f_{s1}^6 & f_{s1}^8 \\ 1 & f_{s2}^2 & f_{s2}^4 & f_{s2}^6 & f_{s2}^8 \\ 1 & f_{s3}^2 & f_{s3}^4 & f_{s3}^6 & f_{s3}^8 \\ 1 & f_{s4}^2 & f_{s4}^4 & f_{s4}^6 & f_{s4}^8 \\ 1 & f_{s5}^2 & f_{s5}^4 & f_{s5}^6 & f_{s5}^8 \end{bmatrix}$$

Then, according to the LU decomposition method, the elements in the lower triangular matrix L and upper triangular matrix U on the right-hand side of equation (5) can be expressed as shown in equation (6) below. Here, $U_{1n}$, etc. denote the elements in the upper triangular matrix U in equation (5), and $L_{m1}$, etc. represent the elements in the lower triangular matrix L in equation (5), where subscript 1n, for example, denotes the n-th column in the first row, and subscript m1 indicates the first column in the m-th row.

$$U_{1n} = C_{1n} \qquad (n = 1 \text{ to } 5) \quad (6)$$
$$L_{m1} = C_{m1}/U_{11} \qquad (m = 2 \text{ to } 5)$$
$$U_{2n} = C_{2n} - L_{21}U_{1n} \qquad (n = 2 \text{ to } 5)$$
$$L_{m2} = (C_{m2} - L_{m2}U_{12})/U_{22} \qquad (m = 3, 4, 5)$$
$$U_{3n} = C_{3n} - L_{31}U_{1n} - L_{32}U_{2n} \qquad (n = 3, 4, 5)$$
$$L_{m3} = (C_{m3} - L_{m1}U_{13} - L_{m2}U_{23})/U_{33} \qquad (m = 4, 5)$$
$$U_{4n} = C_{4n} - L_{41}U_{1n} - L_{42}U_{2n} - L_{43}U_{3n} \qquad (n = 4, 5)$$
$$L_{54} = (C_{54} - L_{51}U_{14} - L_{52}U_{24} - L_{53}U_{34})/U_{44}$$
$$U_{55} = C_{55} - L_{51}U_{15} - L_{52}U_{25} - L_{53}U_{35} - L_{54}U_{45}$$

Accordingly, the unknowns $a_0$ to $a_4$ can be found from equation (7) below, using the elements $L_{mn}$, $U_{mn}$ and the real parts $\alpha'_{ij,s1}$ to $\alpha'_{ij,s5}$ of the mutual impedance $Z_{ij}$. According to this equation (7), the unknowns $a_0$ to $a_4$ can be found from $Y_n$ obtained from equation (8) given hereinafter and the elements $U_{mn}$ calculated by equation (6).

$$a_4 = Y_5/U_{55} \quad (7)$$
$$a_m = (Y_{m+1} - \Sigma U_{m+1,n} \times a_n)/U_{m+1,m+1}$$

where $\Sigma$ denotes the sum from n=m+1 to 4, and m=3, 2, 1, 0. Further, $U_{m+1,n}$ denotes the element in the (m+1)th row and the n-th column of the upper triangular matrix U, and $U_{m+1,m+1}$ indicates the element in the (m+1)th row and the (m+1)th column of the upper triangular column U.

Here, $Y_n$ is set as shown in equation (8) below. According to equation (8), $Y_n$ can be obtained from the elements $L_{mn}$ calculated by equation (6) and the values of the real parts $\alpha'_{ij,s1}$ to $\alpha'_{ij,s5}$ determined by the combination of the values of i and j.

$$Y_1 = \alpha'_{ij,s1} \quad (8)$$
$$Y_m = (\alpha'_{ij,sm} - \Sigma L_{mn} \times Y_n)$$

where $\Sigma$ denotes the sum from n=1 to m, and m=2, 3, 4, 5. Further, $L_{mn}$ represents the element in the m-th row and the n-th column of the lower triangular matrix L.

As is apparent from the above explanation, the values of the elements $L_{mn}$ and $U_{mn}$ are determined only by the values of the five sample frequencies $f_{s1}$ to $f_{s5}$, and are independent of the values of i and j. Accordingly, the values of the elements $L_{mn}$ and $U_{mn}$ need only be obtained once at the beginning by solving equation (6), regardless of whether the values of the real parts $\alpha'_{ij,s1}$ to $\alpha'_{ij,s5}$ of the mutual impedance $Z_{ij}$ change as the values of i and j change.

The unknowns $a_0$ to $a_4$ vary with the values of i and j, and hence with the values of the real parts $\alpha'_{ij,s1}$ to $\alpha'_{ij,s5}$ of the mutual impedance $Z_{ij}$, but can be obtained by repeating the calculations of equations (7) and (8) according to the change of the values of i and j. More specifically, using equation (8), $Y_1$ and $Y_m$ are obtained from the elements $L_{mn}$ and the values of the real parts $\alpha'_{ij,s1}$ to $\alpha'_{ij,s5}$ determined by the combination of the values of i and j, and using equation (7), the unknowns $a_0$ to $a_4$ are determined from $Y_1$, $Y_m$, and the elements $U_{mn}$.

The above explanation also applies for the approximation coefficients $b_0$ to $b_4$ for the imaginary parts $\beta'_{ij,s1}$ to $\beta'_{ij,s5}$ of the approximate equation for the mutual impedance. The same also applies for the mutual admittance and mutual reaction. These are apparent from the similarity between the respective approximate equations.

Figure 4:
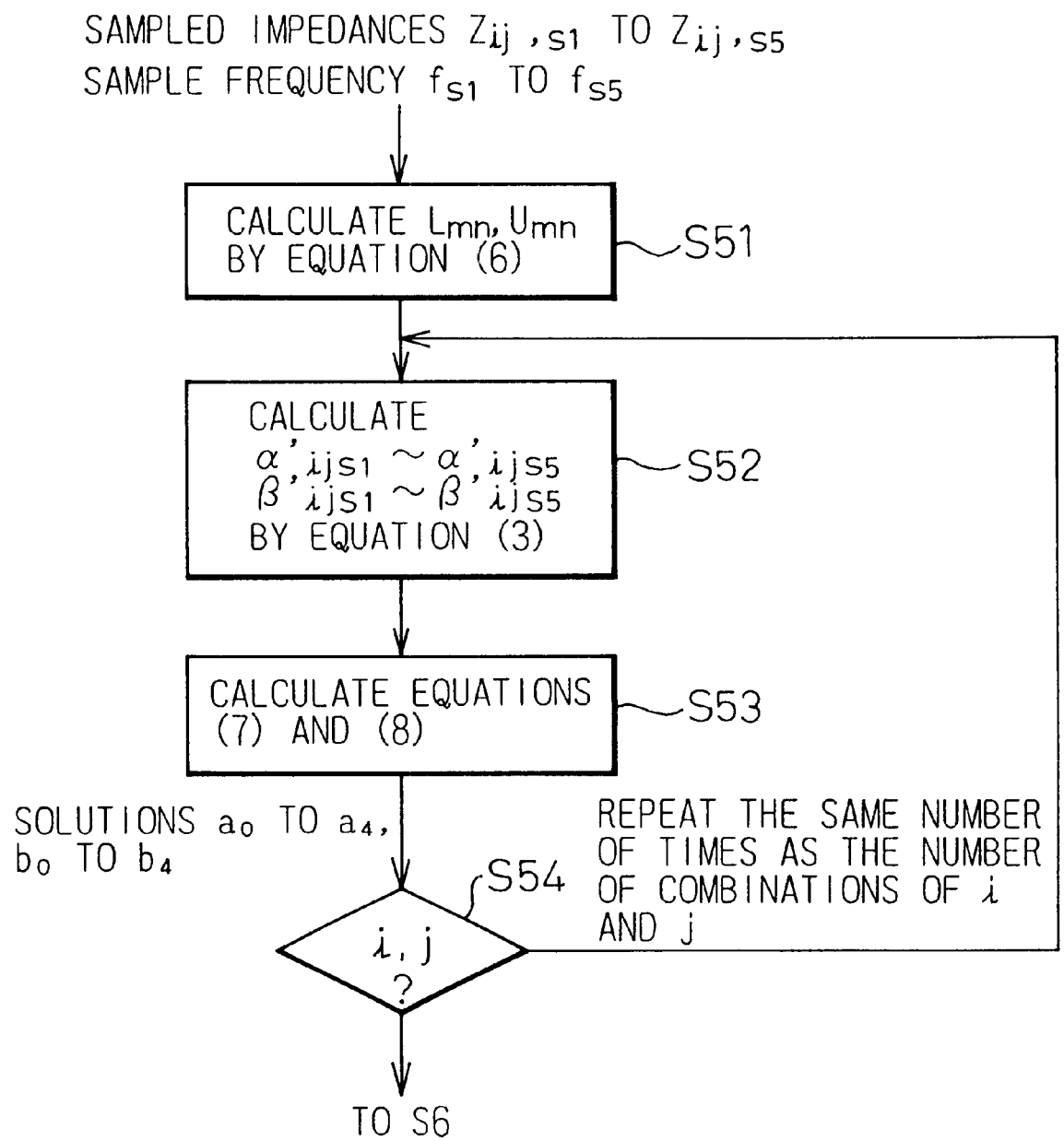
FIG. 4 is a flowchart for the calculation of approximation coefficients by LU decomposition.

FIG. 4 is a flowchart illustrating the process for calculating the approximation coefficients by the LU decomposition method. The series of processing steps S51 to S54 shown in FIG. 4 is performed in the approximation coefficient calculation processing section 5, and corresponds to step S5 shown in FIG. 3 previously explained. The same process for the calculation of the approximation coefficients applies, whether the approximate equation is for the mutual impedance, the mutual admittance, or the mutual reaction.

As shown in FIG. 4, first the elements $L_{mn}$ and $U_{mn}$ are obtained from the values of the five sample frequencies $f_{s1}$ to $f_{s5}$ in accordance with equation (6) (S51). Next, in accordance with equation (3), specific values of the real parts, $\alpha'_{ij,s1}$ to $\alpha'_{ij,s5}$, and the imaginary parts, $\beta'_{ij,s1}$ to $\beta'_{ij,s5}$, of the mutual impedance $Z_{ij}$, corresponding to a specific combination of the values of i and j, are obtained from the values of the mutual impedance $Z_{ij}$ calculated by the sample calculation processing section 4 (S52). Then, equations (7) and (8) are calculated (S53), using the values of the elements $L_{mn}$ and $U_{mn}$ obtained in S51 and the values of the real parts, $\alpha'_{ij,s1}$ to $\alpha'_{ij,s5}$, and the imaginary parts, $\beta'_{ij,s1}$ to $\beta'_{ij,s5}$, of the mutual impedance $Z_{ij}$ obtained in S52. In this way, the approximation coefficients $a_0$ to $a_4$ and $b_0$ to $b_4$, corresponding to a specific combination of the values of i and j, can be obtained by a relatively simple calculation process. The approximation coefficients $a_0$ to $a_4$ and $b_0$ to $b_4$ thus obtained are for two elements determined by specific values of i and j; therefore, the process for obtaining the approximation coefficients $a_0$ to $a_4$ and $b_0$ to $b_4$ is repeated for all combinations of the values of i and j. Then, it is checked whether the approximation coefficients $a_0$ to $a_4$ and $b_0$ to $b_4$ have been obtained for all combinations of the values of i and j (S54). If the answer is NO, the process is repeated to obtain the approximation coefficients $a_0$ to $a_4$ and $b_0$ to $b_4$ for the next combination of the values of i and j.

In the process of the present invention, therefore, the process step S51 is performed only once, and only the processing in steps S52 to S54 is repeated the same number of times as the number of possible combinations of the values of i and j. This improves the processing speed.

Simultaneous Equations Accounting for the Effect of Electromagnetic Field Scattering by Dielectric When taking into account the effect of the electromagnetic field scattering caused by the dielectric, in addition to the mutual impedance $Z^0_{c,c}$ between metal segments, the mutual impedances $Z^0_{c,d}$ and $Z^0_{d,c}$ between metal and dielectric segments, the mutual impedances $Z^0_{d,d}$ and $Z^d_{d,d}$ between dielectric segments, the mutual admittances $Y^0_{d,d}$ and $Y^d_{d,d}$ between dielectric segments, the mutual reactions $B^0_{c,d}$ and $B^0_{d,c}$ between metal and dielectric segments, and the mutual reactions $B^0_{d,d}$ and $B^d_{d,d}$ between dielectric segments, are obtained. That is, in the actual analysis of an electric circuit device, all of the mutual impedances, mutual admittances, and mutual reactions are obtained. Here, the superscript "0" denotes a calculated value in air, the superscript "d" a calculated value in the dielectric, the subscript "c" the metal, the subscript "d" the dielectric, the subscript "c,c" the interrelation from metal to metal, the subscript "d,d" the interrelation from dielectric to dielectric, the subscript "c,d" the interrelation from dielectric to metal, and the subscript "d,c" the interrelation from metal to dielectric.

The mutual impedance, etc. at sample frequencies are calculated by the sample calculation processing section 4 using a known calculation process. The mutual impedance, etc. at designated frequencies (e.g., harmonics) within the specified frequency range are calculated by the approximate calculation processing section 9 in the calculation process using the approximate equations of the present invention. Then, the simultaneous equations of the moment method are set in the input processing section 1 or the electromagnetic current calculation processing section 10.

Using the wave source $V_i$ present on the printed circuit board, the coefficient $I_{c,n}$ denoting the magnitude of the electric current flowing in each metal segment, the coefficient $I_{d,n}$ denoting the magnitude of the equivalent electric current flowing on the surface of each dielectric segment, and the coefficient $M_n$ denoting the magnitude of the equivalent magnetic current flowing on the surface of each dielectric segment, the following simultaneous equations of the moment method are set, where [ ] denotes a matrix or vector.

From the boundary condition that the value of the electric field on the surface of the metal is zero, the following simultaneous equations of the moment method are set.

$$[Z^0_{c,c}][I_{c,n}]+[Z^0_{c,d}][I_{d,n}]+[B^0_{c,d}][M_n]=[V_i]$$

From the boundary condition that the tangential components of the electric field are equal on both sides of the boundary surface of the dielectric, the following simultaneous equations of the moment method are set.

$$[Z^0_{d,c}][I_{c,n}]+[Z^0_{d,d}+Z^d_{d,d}][I_{d,n}]+[B^0_{d,d}+B^d_{d,d}][M_n]=[0]$$

From the boundary condition that the tangential components of the magnetic field are equal on both sides of the boundary surface of the dielectric, the following simultaneous equations of the moment method are set.

$$[B^0_{d,c}][I_{c,n}]+[B^0_{d,d}+B^d_{d,d}][I_{d,n}]+[-Y^0_{d,d}-Y^d_{d,d}][M_n]=[0]$$

Combining the above, the simultaneous equations of the moment method shown in FIG. 5 are set. In setting the simultaneous equations of the moment method, if a core realizing a reduction in common mode electric current is inserted in the cable, the mutual impedance $Z^0_{c,c}$ of the cable must be reduced by the impedance ZL of the core. In that case, therefore, the simultaneous equations of the moment method are transformed as shown in FIG. 6.

Further, when there is an earth surface causing reflection, a mirror image of the structure is generated, and electromagnetic currents identical in magnitude but opposite in direction to those of the physical structure are assumed for the mirror image of the structure. Then, a matrix of the moment method for the physical structure, such as shown in FIG. 7, is calculated, and also, a matrix of the moment method for the mirror image, such as shown in FIG. 8, is calculated. Using these two matrix equations, the simultaneous equations of the moment method shown in FIG. 9 are set.

Utilizing the property that the mirror image theoretically has a negative polarity with respect to the physical structure, if reflection processing is performed in which an image current is represented by one having a negative polarity with respect to the physical structure current, an increase in the number of unknowns can be avoided, and as a result, the calculation time only increases by a factor of about 2. On the other hand, if the image current is treated as an unknown, the number of unknowns is doubled, and therefore, the calculation time increases by a factor of about 4. The reflection processing, coupled with the approximate calculations, thus achieves a further improvement in the processing time.

The electromagnetic current calculation processing section 10 substitutes the mutual impedance, etc. obtained by approximate calculations into the above-given simultaneous equations of the moment method, and by solving the simultaneous equations, calculates the electric current flowing in the metal on the printed circuit board, the equivalent electric current and equivalent magnetic current flowing on the surface of the dielectric on the printed circuit board, the electric current (including the common mode electric current) flowing to the cable, wire, and leads, and the common mode electric current flowing to the metal housing and metal structure.

Accuracy of Approximate Calculations

To verify the validity of the present invention, the mutual impedance values obtained by the approximate calculations of the present invention were compared with those obtained without using approximate calculations, and the errors were examined.

FIG. 10 shows sample frequencies and also a frequency for which the impedance was calculated by approximation. In FIG. 10, values of wavenumber k corresponding to the respective frequencies are also shown.

Five sample frequencies were taken, so that n=5. Therefore, the approximate equation, $Z_{ij}=\exp(-jkr)[a_0+a_1f^2+a_2f^4+a_3f^6+a_4f^8+j(b_0/f+b_1f+b_2f^3+b_3f^5+b_4f^7)]$, was used for the calculation of the mutual impedance $Z_{ij}$. The five sample frequencies, $f_{s1}$, $f_{s2}$, $f_{s3}$, $f_{s4}$, and $f_{s5}$, were chosen to be 30 MHz (3e+007 or $3\times10^7$), 250 MHz, 500 MHz, 750 MHz, and 1 GHz. This setting is for the frequency range of 30 MHz to 1 GHz. The mutual impedances $Z_{ij}$ at the five sample frequencies are obtained by the sample calculation processing section 4 using a known calculation process used in the moment method.

Figure 11:
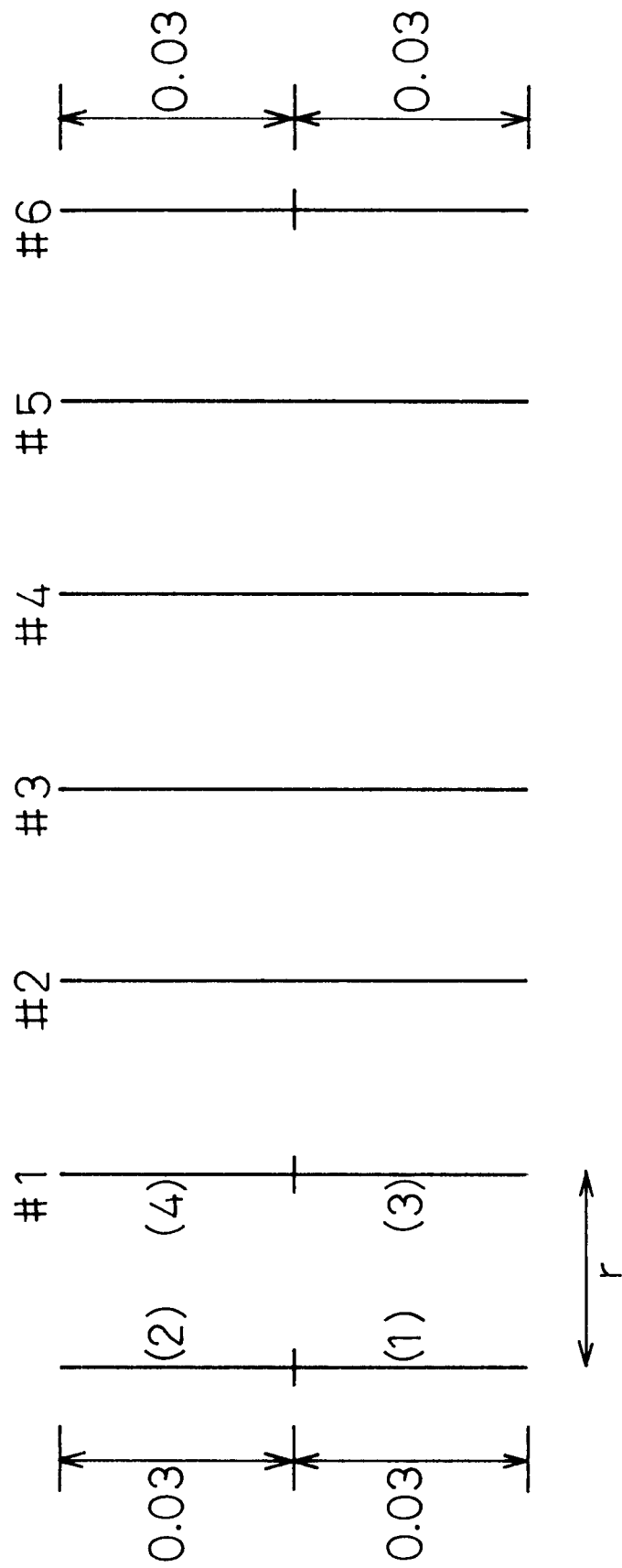
FIG. 11 is a diagram showing monopoles assumed in a comparison test.

The frequency f for which the mutual impedance $Z_{ij}$ was to be obtained by approximate calculation was set at 100 MHz (1e+008 or $1\times10^8$). In this comparison test, the monopole structure shown in FIG. 11 was assumed. The comparison test assumed that the monopoles (1) and (2) shown at the extreme left in the figure were fixed. On the other hand, monopoles (3) and (4) were chosen to be one of #1 to #6 in the figure, the monopole-to-monopole distance r thus being variable. In FIG. 11, it is shown as if the monopoles were placed at equally spaced intervals; actually, the distance from the monopoles (1) and (2) to the dipole #1 is 0.0001 m (meter), the distance to the dipole #2 is 0.001 m, the distance to the dipole #3 is 0.01 m, the distance to the dipole #4 is 0.1 m, the distance to the dipole #5 is 1 m, and the distance to the dipole #6 is 10 m. Wire diameter, i.e., monopole diameter, was 2 $\mu$m. The length of each monopole was 0.03 m.

FIG. 12 shows calculated values of the mutual impedance $Z_{ij}$ when the dipole-to-dipole distance r=0 m. Since the distance r=0 m, FIG. 12 actually shows the values obtained by calculating the self-impedance of the monopoles (1) and (2) using the approximate equation. In this patent specification, the concept of mutual impedance includes self-impedance.

In the approximation coefficient section of FIG. 12, $c_0$, $c_1$, $c_2$, $c_3$, and $c_4$ respectively indicate the calculated values of the approximation coefficients $a_0$, $a_1$, $a_2$, $a_3$, and $a_4$ for the real part of the above approximate equation. Likewise, $m_0$, $m_1$, $m_2$, $m_3$, and $m_4$ respectively indicate the calculated values of the approximation coefficients $b_0$, $b_1$, $b_2$, $b_3$, and $b_4$ for the imaginary part of the same approximate equation. In FIG. 12, $c_0$, $c_1$, $c_2$, $c_3$, and $c_4$ are different, and therefore to be distinguished, from the approximation coefficients used in the earlier given approximate equation for the mutual reaction.

The approximation coefficients $c_0$ to $c_4$ and $m_0$ to $m_4$ are obtained in the approximation coefficient calculation processing section 5 by using the five sampling frequencies, etc.

FIG. 12 also shows values each obtained by multiplying each approximation coefficient by a power of wavenumber k. For example, $c_1*k^2$ indicates the value obtained by multiplying the approximation coefficient $c_1$ by the second power of wavenumber k. The value of wavenumber k was obtained by substituting the frequency f=100 MHz to be analyzed into the equation k=$2\pi f/c$. Multiplying an approximation coefficient by a power of wavenumber k has the same meaning as multiplying the approximation coefficient by a power of the frequency f. The same also applies in FIGS. 13 to 18.

The exponent part section shows the value of $e^{-jkr}$ in the approximate equation. In the exponent part section, the value of the real part and the value of the imaginary part are shown in parentheses, the former before the comma and the latter after the comma. The approximate value section shows the value of the mutual impedance calculated by the approximate equation of the present invention. In the approximate value section, the value of the real part and the value of the imaginary part are shown in parentheses, the former before the comma and the latter after the comma. The above values are obtained in the approximate calculation processing section 9. The same also applies in FIGS. 13 to 18.

The moment method section shows the value of the mutual impedance calculated without using the approximate equation. In the moment method section, the value of the real part and the value of the imaginary part are shown in parentheses, the former before the comma and the latter after the comma. These values were obtained using the prior art electromagnetic field intensity calculation apparatus. The same also applies in FIGS. 13 to 18.

The error section shows the error between the mutual impedance value obtained without using the approximate equation and the mutual impedance value calculated by the approximate equation of the present invention. In the error section, the error of the real part and the error of the imaginary part are shown in parentheses, the former before the comma and the latter after the comma.

As can be seen from the comparison of the values shown in the moment method section and the approximate value section, the values are very nearly equal between the two sections. As shown in the error section, when the error is calculated to five decimal places of significant figures, the error becomes 0%. This shows an extremely good approximation.

FIG. 13 shows the values when the dipole-to-dipole distance r=0.0001 m, FIG. 14 when r=0.001 m, and FIG. 15 when r=0.01 m. As shown, in these cases also, the error, when calculated to five decimal places of significant figures, is 0%. It is therefore safe to say that in the case of a frequency of 100 MHz, there are no errors when the distance is 0.01 m or less.

FIG. 16 shows the values when the dipole-to-dipole distance r=0.1 m, FIG. 17 when r=1 m, and FIG. 18 when r=10 m. In the cases shown in FIGS. 16 to 18, errors occur as indicated. In the case of the frequency 100 MHz, the error peaks at r=0.1 m. As can be seen from the figures, the error does not increase with increasing dipole distance r, but converges. This also shows that an extremely good approximation is achieved.

Figure 19:
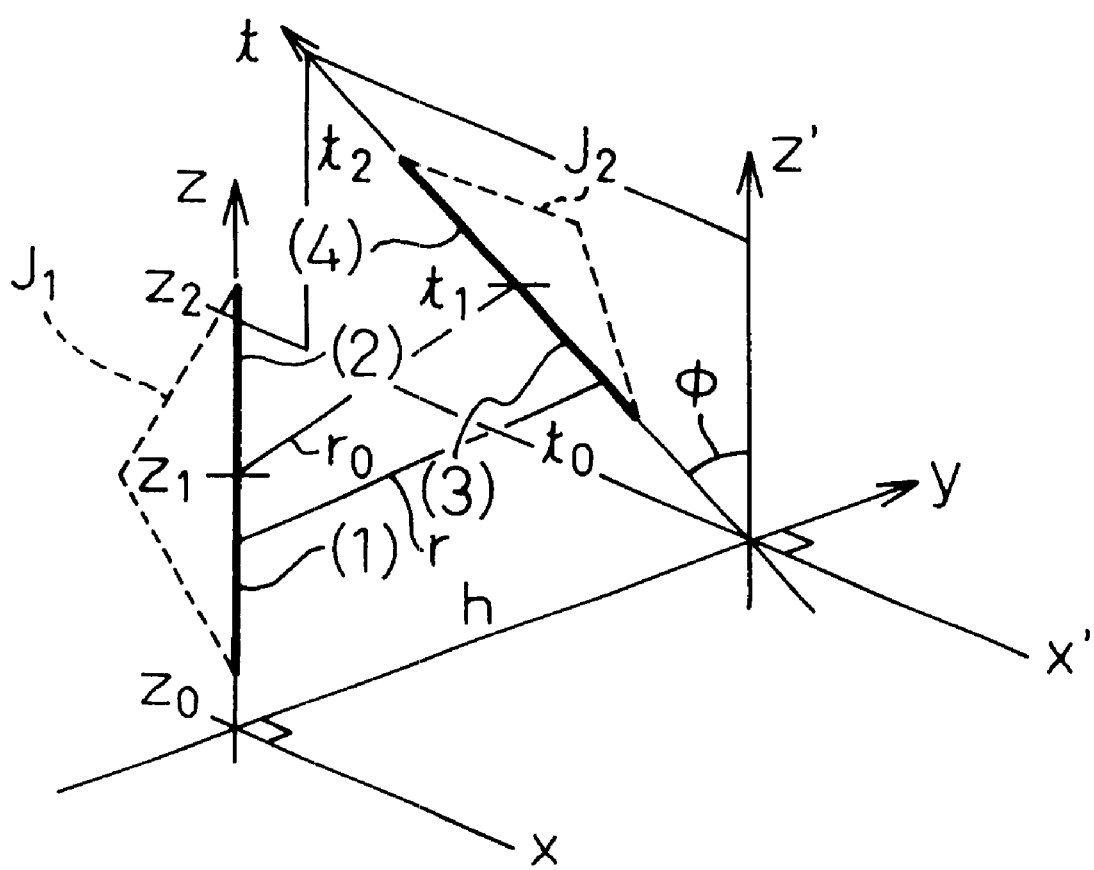
FIG. 19 is a diagram showing monopoles used in the proof of an approximate equation.

Proof that Mutual Impedance, etc. can be Approximated by Polynomials in Frequency We will now prove that the mutual impedance can be approximated using the approximate equation. For an explanation about the approximate equation for the mutual impedance, we consider the monopoles shown in FIG. 19. In FIG. 19, thick lines show the monopoles and dotted lines show the shapes of expansion functions. Monopoles (1), (2) and monopoles (3), (4) are respectively located in two parallel planes separated by a distance h, and the angle between them is denoted by $\phi$. More generally, the tilt angle between monopole (1) and monopole (3) is denoted by $\phi_1$, and the tilt angle between monopole (1) and monopole (4) by $\phi_2$.

The mutual impedance Z between the two monopoles whose expansion functions are $J_1$ and $J_2$ is expressed by the following general equation, where $\omega$ is the angular frequency, r is the distance between the monopoles, $\rho_1 = -1/j\omega \times \partial J_1/\partial t$, and $\rho_2 = -1/j\omega \times \partial J_2/\partial t$. In the equation below, the integration is performed with respect to s so that the equation can be applied as a general equation not only when the monopole shape is linear (a wire) but when it is a surface (a surface patch).

$$Z = j\omega \int_s \left[ \frac{\mu}{4\pi} J_1 J_2 \cos\phi \frac{e^{-jkr}}{r} + \frac{1}{4\pi\varepsilon} \rho_1 \rho_2 \frac{e^{-jkr}}{r} \right] ds$$

The expansion functions $J_1$ and $J_2'$ differ according to the type of the moment method, but the following proof is applicable regardless of the type of the moment method. More specifically, the expansion functions may be those for a sinusoidal current (in the case of piecewise sinusoidal moment method), a triangular current, or a pulse function current distribution. Therefore, the mutual impedance calculation process by the approximate equation of the present invention can be applied regardless of the type of the moment method. The following proof is also applicable whether the monopole shape is of a surface (surface patch) or linear (wire). Accordingly, the mutual impedance calculation process by the approximate equation of the present invention can be applied regardless of the monopole shape.

We will now prove that the mutual impedance can be approximated by a polynomial with terms each involving raising the frequency f to an n-th power (n=-1, 0, 1, 2, ...). In the following proof, however, a more general form, wavelength k, may be used as necessary. Here, k=$\omega$/c, where c is the velocity of light.

The following proof specifically concerns the piecewise sinusoidal moment method, but it will be appreciated that the same proof is also applicable for other modes of the moment method that use a triangular current or a pulse function current distribution as the expansion function.

In the piecewise sinusoidal moment method, the expansion functions for the monopoles (1) to (4) of FIG. 19 can be expressed as Electric Monopole (1) $J_1 = \sin k(z-z_0)/\sin kd_1$ Electric Monopole (2) $J_1 = \sin k(z_2-z)/\sin kd_2$ Electric Monopole (3) $J_2 = \sin k(t-t_0)/\sin kd_3$ Electric Monopole (4) $J_2 = \sin k(t_2-t)/\sin kd_4$ where $d_1$ is the length of the monopole (1), $d_2$ is the length of the monopole (2), $d_3$ is the length of the monopole (3), and $d_4$ is the length of the monopole (4).

Using these expansion functions, the mutual impedance $Z_{13}$ between the monopoles (1) and (3) and the mutual impedance $Z_{14}$ between the monopoles (1) and (4) are obtained first. The mutual impedances $Z_{13}$ and $Z_{14}$ are given by $$Z_{13} = \frac{j\omega\mu}{4\pi \sin kd_1 \sin kd_3} \int_{t_0}^{t_1} \int_{z_0}^{z_1} [\sin k(z-z_0)\sin k(t-t_0)\cos\phi_1 -$$
$$\cos k(z-z_0)\cos k(t-t_0)] \frac{e^{-jkr}}{r} dz\,dt$$

$$Z_{14} = \frac{j\omega\mu}{4\pi \sin kd_1 \sin kd_4} \int_{t_1}^{t_2} \int_{z_0}^{z_1} [\sin k(z-z_0)\sin k(-t+t_2)\cos\phi_2 +$$
$$\cos k(z-z_0)\cos k(-t+t_2)] \frac{e^{-jkr}}{r} dz\,dt$$

The coefficients for the mutual impedances $Z_{13}$ and $Z_{14}$ in the above equations are expressed as $$\frac{j\omega\mu}{4\pi \sin kd_1 \sin kd_3} = j\frac{c\mu}{4\pi} \frac{k}{\sin kd_1 \sin kd_3} = j\alpha \frac{k}{A_1}$$

$$\frac{j\omega\mu}{4\pi \sin kd_1 \sin kd_4} = j\frac{c\mu}{4\pi} \frac{k}{\sin kd_1 \sin kd_4} = j\alpha \frac{k}{A_2}$$

where $\alpha = c\mu/4\pi$

Further, the monopole-to-monopole distance r can be approximated, using $r_0 = (z_1^2 + t_1^2 - 2z_1t_1 \cos\phi + h^2)^{1/2}$, by $r = [r_0^2 + (r^2 - r_0^2)]^{1/2} = (r_0^2 + \Delta)^{1/2} = r_0(1 + \Delta/r_0^2)^{1/2} \approx r_0(1 + \Delta/2r_0^2 - \Delta^2/8r_0^4 + \ldots) = r_0 + \Delta/2r_0 - \Delta^2/8r_0^3 + \ldots = r_0 + d$ Hence the mutual impedances $Z_{13}$ and $Z_{14}$ are expressed as $$Z_{13} = j\alpha\frac{k}{A_1}\exp(-jkr_0)\int_{t_0}^{t_1}\int_{z_0}^{z_1}[\sin k(z-z_0)\sin k(t-t_0)\cos\phi_1 -$$
$$\cos k(z-z_0)\cos k(t-t_0)]\frac{e^{-jkd}}{r}dz\,dt$$

$$Z_{14} = j\alpha\frac{k}{A_1}\exp(-jkr_0)\int_{t_1}^{t_2}\int_{z_0}^{z_1}[\sin k(z-z_0)\sin k(-t+t_2)\cos\phi_2 +$$
$$\cos k(z-z_0)\cos k(-t+t_2)]\frac{e^{-jkd}}{r}dz\,dt$$

where $A_1 = \sin kd_1 \sin kd_3$

Then, setting $z-z_0=u$, $t-t_0=v$, and $w=-t+t_2$, the equations are put in simplified form. Further, assuming that the monopole length is short, the following polynomial approximation is performed.

$\sin ku \approx ku - (ku)^3/6$, $\cos ku \approx 1 - (ku)^2/2$

Calculation example:

$u = 0.1\lambda \rightarrow \sin(0.2\pi) = 0.587785$ $\approx ku = 0.6283 (+6.89\%)$ $\approx ku - (ku)^3/6 = 0.586958 (-0.14\%)$ -continued $$\cos(0.2\pi) = 0.809016$$

$$\approx 1 - (ku)^2/2 = 0.802608\ (-0.79\%)$$

$$u = 0.12\lambda \rightarrow \sin(0.24\pi) = 0.684547$$

$$\approx ku = 0.75398\ (+10.14\%)$$

$$\approx ku - (ku)^3/6 = 0.682542\ (-0.29\%)$$

$$\cos(0.24\pi) = 0.728969$$

$$\approx 1 - (ku)^2/2 = 0.715755\ (-1.81\%)$$

where $\lambda$ is the wavelength, or $$\lambda = \frac{2\pi}{k}.$$

From the above, the real part $R_1$ of the mutual impedance $Z_{13}$ is expressed as follows. In the equation below, $\exp(-jkr_0)$ is omitted.

$$R_1 = \alpha \frac{k}{A_1} \int_{t_0 z_0}^{t_1 z_1} [\sin ku\ \sin kv\ \cos\phi_1 - \cos ku\ \cos kv] \frac{\sin kd}{r} dz dt$$

$$= \alpha \frac{k}{A_1} \int_{t_0 z_0}^{t_1 z_1} \left( \left[ku - \frac{(ku)^3}{6}\right]\left[kv - \frac{(kv)^3}{6}\right]\cos\phi_1 - \left[1 - \frac{(ku)^2}{2}\right] \right.$$

$$\left[1 - \frac{(kv)^2}{2}\right]\right)\left[kd - \frac{(kd)^3}{6}\right]\frac{1}{r}dzdt$$

$$= \alpha \frac{k}{A_1} \int_{t_0 z_0}^{t_1 z_1} \left( \left[uvk^2 - \frac{uv^3 + u^3v}{6}k^4 + \frac{u^3v^3}{36}k^6\right]\cos\phi_1 - \right.$$

$$\left[1 - \frac{u^2 + v^2}{2}k^2 + \frac{u^2v^2}{4}k^4\right]\right)\left[kd - \frac{(kd)^3}{6}\right]\frac{1}{r}dzdt$$

$$= \alpha \frac{k}{A_1} \int_{t_0 z_0}^{t_1 z_1} \left( \left[uvdk^4 - \left(\frac{uv^3 + u^3v}{6}d + \frac{uvd^3}{6}\right)k^6 + \right.\right.$$

$$\left.\left(\frac{u^3v^3}{36}d + \frac{(uv^3 + u^3v)d^3}{36}\right)k^8 - \frac{u^3v^3d^3}{216}k^{10}\right]\cos\phi_1 - dk^2 +$$

$$\left(\frac{u^2 + v^2}{2}d + \frac{d^3}{6}\right)k^4 - \left(\frac{u^2v^2}{4}d + \frac{u^2+v^2}{12}d^3\right)k^6 +$$

$$\left.\frac{u^2v^2}{24}d^3k^8\right]\right)\frac{1}{r}dzdt$$

Replacing the coefficients for the terms with $k^4$, etc. by $P_1$ to $P_8$ to simplify the equation in form, the above equation can be written as $$R_1 = [\alpha/A_1][(P_1k^4 - P_2k^6 + P_3k^8 - P_4k^{10})\cos\phi_1 - P_5k^2 + P_6k^4 - P_7k^6 + P_8k^8]$$

Further, since $A_1$ is a sin function, this can be approximated as $A_1 = \sin kd_1 \sin kd_3 \approx d_1 d_3 k^2$. Substituting this approximate value of $A_1$ and inserting the previously omitted $\exp(-jkr_0)$ back into the equation, the above equation can be written as $$R_1 = [\alpha \exp(-jkr_0)/(d_1d_3k^2)][(P_1k^4 - P_2k^6 + P_3k^8 -$$

$$P_4k^{10})\cos\phi_1 - P_5k^2 + P_6k^4 - P_7k^6 + P_8k^8] = [\alpha\exp(-jkr_0)/(d_1d_3)][(P_1k^2 - P_2k^4 + P_3k^6$$

$$-P_4k^8)\cos\phi_1 - P_5 + P_6k^2 - P_7k^4 + P_8k^6]$$

The real part $R_1$ of the mutual impedance $Z_{13}$ has thus been obtained.

Next, the imaginary part $I_1$ of the mutual impedance $Z_{13}$ is expressed as follows. In the equation below, $\exp(-jkr_0)$ is omitted.

$$I_1 = \alpha \frac{k}{A_1} \int_{t_0 z_0}^{t_1 z_1} [\sin ku\ \sin kw\ \cos\phi_1 + \cos ku\ \cos kw] \frac{\cos kd}{r} dz dt$$

$$= \alpha \frac{k}{A_1} \int_{t_0 z_0}^{t_1 z_1} \left( \left[ku - \frac{(ku)^3}{6}\right]\left[kw - \frac{(kw)^3}{6}\right]\cos\phi_1 - \left[1 - \frac{(ku)^2}{2}\right] \right.$$

$$\left[1 - \frac{(kw)^2}{2}\right]\right]\left[1 - \frac{(kd)^2}{2}\right]\frac{1}{r}dzdt$$

$$= \alpha \frac{k}{A_1} \int_{t_0 z_0}^{t_1 z_1} \left( \left[uwk^2 - \frac{uw^3 + u^3w}{6}k^4 + \frac{u^3w^3}{36}k^6\right]\cos\phi_1 - \right.$$

$$1 + \frac{u^2 + w^2}{2}k^2 - \frac{u^2w^2}{4}k^4\right]\left[1 - \frac{(kd)^2}{2}\right]\frac{1}{r}dzdt$$

$$= \alpha \frac{k}{A_1} \int_{t_0 z_0}^{t_1 z_1} \left( \left[uwk^3 - \left(\frac{uw^3 + u^3w}{6} + \frac{uwd^2}{2}\right)k^5 + \right.\right.$$

$$\left(\frac{u^3w^3}{36} + \frac{uw^3 + u^3w}{12}d^2\right)k^7 - \frac{u^3w^3}{72}d^2k^9\right]\cos\phi_1 - k +$$

$$\left(\frac{u^2 + w^2}{2} + \frac{d^2}{2}\right)k^3 - \left(\frac{u^2w^2}{4} + \frac{u^2+w^2}{4}d^2\right)k^5 +$$

$$\left.\frac{u^2w^2}{8}d^2k^7\right]\right)\frac{1}{r}dzdt$$

Replacing the coefficients for the terms with $k^3$, etc. by $Q_1$ to $Q_8$ to simplify the equation in form, the above equation can be written as $$I_1 = [\alpha/A_1][(Q_1k^3 - Q_2k^5 + Q_3k^7 - Q_4k^9)\cos\phi_1 - Q_5k + Q_6k^3 - Q_7k^5 + Q_8k^7]$$

Further, substituting the approximate value of $A_1 = \sin kd_1 \sin kd_3 \approx d_1 d_3 k^2$ and inserting the previously omitted $\exp(-jkr_0)$ back into the equation, the above equation can be written as $$I_1 = [\alpha\exp(-jkr_0)/(d_1d_3k^2)][(Q_1k^3 - Q_2k^5 + Q_3k^7$$

$$-Q_4k^9)\cos\phi_1 - Q_5k + Q_6k^3 - Q_7k^5 + Q_8k^7] = [\alpha\exp(-jkr_0)/(d_1d_3)][(Q_1k - Q_2k^3 + Q_3k^5 - Q_4$$

$$k^7)\cos\phi_1 - Q_5/k + Q_6k - Q_7k^3 + Q_8k^5]$$

The imaginary part $I_1$ of the mutual impedance $Z_{13}$ has thus been obtained.

Hence, the mutual impedance $Z_{13}$ is expressed as $$Z_{13} = R_1 + jI_1 = [\alpha\exp(-jkr_0)/(d_1d_3)][(P_1k^2 - P_2k^4 + P_3k^6 - P_4k^8)\cos\phi_1 - P_5 + P_6k^2 -$$

$$P_7k^4 + P_8k^6] + j[\alpha\exp(-jkr_0)/(d_1d_3)][(Q_1k - Q_2k^3 + Q_3k^5 - Q_4k^7)\cos\phi_1 - Q_5/k + Q_6k - Q_7k^3 + Q_8k^5]$$

The mutual impedance $Z_{14}$ can also be obtained in like manner. The equation expressing the mutual impedance $Z_{14}$ is fundamentally the same as that for the mutual impedance $Z_{13}$, except that the terms not multiplied by $\cos\phi$ are reversed in sign. That is, the mutual impedance $Z_{14}$ is expressed as shown below. Here, R and S are used as the coefficients corresponding to P and Q.

$$Z_{14} = [\alpha\exp(-jkr_0)/(d_1d_4)][(R_1k^2 - R_2k^4 + R_3k^6 - R_4k^8)\cos\phi_2 + R_5 - R_6k^2 + R_7k^4 - R_8k^6] + j$$

$$[\alpha\exp(-jkr_0)/(d_1d_4)][(S_1k - S_2k^3 + S_3k^5 - S_4k^7)\cos\phi_2 + S_5/k - S_6k + S_7k^3 - S_8k^5]$$

Hence, the mutual impedances $(Z_{13}+Z_{14})$ are generally expressed as $$Z_{13}+Z_{14}=\exp(-jkr_0)[(C_0+C_1k^2+C_2k^4+C_3k^6+C_4k^8+\ldots+j(C_5k^{-1}+C_6k+C_7k^3+C_8k^5+C_9k^7+\ldots)]$$

The mutual impedances $(Z_{23}+Z_{24})$ also can be obtained in like manner. $Z_{23}$ is the mutual impedance between the monopoles (2) and (3) and $Z_{24}$ the mutual impedance between the monopoles (2) and (4).

Accordingly, the mutual impedances $(Z_{13}+Z_{14}+Z_{23}+Z_{24})$ can be expressed by a polynomial in wavenumber k (i.e., frequency f), similarly to the above equation.

For the mutual admittance, it is possible to prove that the approximation can be done by a polynomial of frequency, in a manner similar to the mutual impedance, and the approximate equation is identical to that for the mutual impedance, as previously described. Accordingly, the proof is not given here.

It will be proved that the mutual reaction can be approximated using the approximate equation. For an explanation of the approximate equation for the mutual reaction, the monopoles shown in FIG. 19, where, of the monopoles (1) to (4), the monopoles (3) and (4) are regarded as magnetic current monopoles, will be considered.

First, a magnetic field produced by an electric current source is considered.

The expansion functions for the monopoles (1) to (4) can be expressed as

Electric current monopole (1) $J_1 = \sin k(z-z_0)/\sin kd_1$

Electric current monopole (2) $J_2 = \sin k(z_2-z)/\sin kd_2$

Magnetic current monopole (3) $M_3 = \sin k(t-t_0)/\sin kd_3$

Magnetic current monopole (4) $M_4 = \sin k(t_2-t)/\sin kd_4$

Further, unit vectors can be expressed as shown below.
Unit vector:
Monopole (1) $(s_x, s_y, s_z) = (0, 0, 1)$
Monopole (3) $(t_x, t_y, t_z) = (\sin \phi_1, 0, \cos \phi_1)$
Monopole (4) $(\sin \phi_2, 0, \cos \phi_2)$
$\rho$ direction $(v_x, v_y, v_z) = (x/\rho, h/\rho, 0)$
$\phi$ direction $(w_x, w_y, w_z) = (-h/\rho, x/\rho, 0)$
When the electric current source exists only on the z-coordinate, the electromagnetic field becomes circularly symmetrical (independent of the $\phi$-coordinate), and only $H\phi$ exists, which can be expressed as $$H\phi = \frac{1}{\mu}\nabla \times A = \frac{1}{\mu}\left(\frac{\partial A\rho}{\partial z} - \frac{\partial A_z}{\partial \rho}\right)$$

$A\rho$=0, hence $$H\phi = -\frac{1}{\mu}\frac{\partial A_z}{\partial \rho}$$

Next, we consider the reaction.

In FIG. 19, since the tangential components of the magnetic field on the monopoles (3) and (4) are given by $Ht=-h/\rho \times H\phi \sin \phi$, the reaction B can be expressed as $$B = -h\int_t^M M\frac{H\phi}{\rho}\sin\phi\, h\, dt$$

$$= \frac{h}{\mu}\int_t M\frac{1}{\rho}\frac{\partial A_z}{\partial \rho}\sin\phi\, dt$$

Here, the following conditions are substituted into the above equation.

$$A_z = \frac{\mu}{4\pi}\int_z J\frac{e^{-jkr}}{r}dz$$

$\rho=(x^2+h^2)^{1/2}r+\{\rho^2+(z-z')^2\}^{1/2}=(z^2+t^2-2zt\cos\phi+h^2)^{1/2}z'$: z coordinate of monopole (3), (4)

$$\frac{dr}{d\rho} = \frac{\rho}{r}$$

$$\frac{\partial A_z}{\partial \rho} = \frac{\mu}{4\pi}\int_z J\frac{\partial}{\partial \rho}\frac{e^{-jkr}}{r}dz$$

$$= \int_z J\left(-jk\frac{\rho}{r^2}e^{-jkr} - \frac{\rho}{r^3}e^{-jkr}\right)dz$$

Hence, the reaction B can be expressed as $$B = \frac{h}{4\pi}\int_t\int_z J M\frac{1}{\rho}\frac{\partial}{\partial \rho}\frac{e^{-jkr}}{r}\sin\phi\, dz\, dt$$

$$\frac{h\sin\phi}{4\pi}\int_t\int_z J M\left[-\frac{jk}{r^2} - \frac{1}{r^3}\right]e^{-jkr}dz\, dt$$

Further, since $r \approx r_0+d$, the reaction B can be expressed as $$B \approx \frac{h\sin\phi}{4\pi}e^{-jkr0}\int_t\int_z M J\left[-\frac{jk}{r^2} - \frac{1}{r^3}\right]e^{-jkd}dz\, dt$$

Accordingly, the reaction $B_{13}$ between the monopoles (1) and (3) and the reaction $B_{14}$ between the monopoles (1) and (4) can be expressed as $$B_{13} = \frac{h\sin\phi_1}{4\pi\sin kd_1\sin kd_3}e^{-jkr0}\int_t\int_z \sin k(z-z_0)$$

$$\sin k(t-t_0)\left[-\frac{jk}{r^2} - \frac{1}{r^3}\right]e^{-jkd}dz\, dt$$

$$B_{14} = \frac{h\sin\phi_2}{4\pi\sin kd_1\sin kd_4}e^{-jkr0}\int_t\int_z \sin k(z-z_0)$$

$$\sin k(t_2-t)\left[-\frac{jk}{r^2} - \frac{1}{r^3}\right]e^{-jkd}dz\, dt$$

Then, setting $z-z_0=u$, $t-t_0=v$, and $w=-t+t_2$, the equations are put in simplified form. Further, assuming that the monopole length is short, the following polynomial approximation is performed. That is, $\sin ku \approx ku-(ku)^3/6$ and $\cos ku \approx 1-(ku)^2/2$ From the above, the second term on the right-hand side of the mutual reaction $B_{13}$ equation can be written as $$\int_t\int_z \sin ku \sin kv\left[-\frac{1}{r^3}\right]e^{-jkd}dz\, dt =$$

$$-\int_t\int_z\left[ku - \frac{(ku)^3}{6}\right]\left[kv - \frac{(kv)^3}{6}\right][\cos kd - j\sin kd]\frac{1}{r^3}dz\, dt =$$

$$-\int\int_t\int_z\left[\left[ku-\frac{(ku)^3}{6}\right]\left[kv-\frac{(kv)^3}{6}\right]\left[1-\frac{(kd)^2}{2}\right]-\right.$$

$$\left.j\left[ku-\frac{(ku)^3}{6}\right]\left[kv-\frac{(kv)^3}{6}\right]\left[kd-\frac{(kd)^3}{6}\right]\right]\frac{1}{r^3}dzdt=$$

$$-\int_t\int_z\left[uvk^2-\frac{u^3v+uv^3+3uvd^2}{6}k^4+\frac{u^3v^3+3u^3vd^2+3uv^3d^2}{36}k^6-\right.$$

$$\frac{u^3v^3d^2}{72}k^8-j\left[uvdk^3-\frac{u^3vd+uv^3d+uvd^3}{6}k^5+\right.$$

$$\left.\left.\frac{u^3v^3d+u^3vd^3+uv^3d^3}{36}k^7-\frac{u^3v^3d^3}{216}k^9\right]\right]\frac{1}{r^3}dzdt$$

Replacing the coefficients for the terms with $k^2$, etc. by $P_1$ to $P_8$ to simplify the equation in form, the above equation can be written as $$P_1k^2+P_2k^4+P_3k^6+P_4k^8+j(P_5k^3+P_6k^5+P_7k^7+P_8k^9)$$

Likewise, the first term on the right-hand side of the reaction $B_{13}$ equation can also be written as $$\int_t\int_z\sin ku\sin kv\left[-\frac{jk}{r^2}\right]e^{-jkd}dzdt=$$

$$-\int_t\int_z\left[uvk^2-\frac{u^3v+uv^3+3uvd^2}{6}k^4+\frac{u^3v^3+3u^3vd^2+3uv^3d^2}{36}k^6-\right.$$

$$\frac{u^3v^3d^2}{72}k^8-j\left[uvdk^3-\frac{u^3vd+uv^3d+uvd^3}{6}k^5+\right.$$

$$\left.\left.\frac{u^3v^3d+u^3vd^3+uv^3d^3}{36}k^7-\frac{u^3v^3d^3}{216}k^9\right]\right]\frac{jk}{r^2}dzdt=$$

$$-\int_t\int_z\left[uvdk^4-\frac{u^3vd+uv^3d+uvd^3}{6}k^6+\frac{u^3v^3d+u^3vd^3+uv^3d^3}{36}k^8-\right.$$

$$\frac{u^3v^3d^3}{216}k^{10}+j\left[uvk^3-\frac{u^3v+uv^3+3uvd^2}{6}k^5+\right.$$

$$\left.\left.\frac{u^3v^3+3u^3vd^2+3uv^3d^2}{36}k^7-\frac{u^3v^3d^2}{72}k^9\right]\right]\frac{1}{r^2}dzdt$$

Replacing the coefficients for the terms with $k^2$, etc. by $Q_1$ to $Q_8$ to simplify the equation in form, the above equation can be written as $$Q_1k^4+Q_2k^6+Q_3k^8+Q_4k^{10}+j(Q_5k^3+Q_6k^5+Q_7k^7+Q_8k^9)$$

Accordingly, the mutual reaction $B_{13}$ is expressed as $$B_{13}=(h_1\sin\phi_1/4\pi\sin kd_1\sin kd_3)e^{-jkr0}\times[P_1k^2+P_2k^4+P_3k^6$$

$$+P_4k^8+j(P_5k^3+P_6k^5+P_7k^7+P_8k^9)+Q_1k^4+Q_2k^6+Q_3k^{8+}$$

$$Q_4k^{10}+j(Q_5k^3+Q_6k^5+Q_7k^7+Q_8k^9)]$$

Substituting the approximate value, $\sin kd_1 \sin kd_3 \approx d_1d_3k^2$, into the above equation, the mutual reaction $B_{13}$ can be expressed as $$B_{13}=(h\sin\phi_1/4\pi d_1d_3)e^{-jkr0}\times[P_1+(P_2+Q_1)k^2+(P_3+Q_2)k^4+(P_4+Q_3)k^6+Q_4k^8+j$$

$$[(P_5+Q_5)k+(P_6+Q_6)k^3+(P_7$$

$$+Q_7)k^5+(P_8+Q_8)k^7]]=e^{-jkr0}[R_1+R_2k^2+R_3k^4+R_4k^6+R_5k^8+j$$

$$(R_6k+R_7k^3+R_8k^5+R_9k^7)]$$

The mutual reaction $B_{14}$ can be obtained in like manner. That is, the mutual reaction $B_{14}$ is expressed as $$B_{14}=e^{-jkr0}[S_1+S_2k^2+S_3k^4+S_4k^6+S_5k^8+j(S_6k+S_7k^3+S_8k^5+S_9k^7)]$$

Accordingly, the mutual reactions ($B_{13}+B_{14}$) can be written as $$B_{13}+B_{14}=e^{-jkr0}[C_1+C_2k^2+C_3k^4+C_4k^6+C_5k^8+j(C_6k+C_7k^3+C_8k^5+C_9k^7)]$$

The mutual reactions ($B_{23}+B_{24}$) also can be obtained in like manner. $B_{23}$ is the mutual reaction between the monopoles (2) and (3) and $B_{24}$ the mutual reaction between the monopoles (2) and (4).

Accordingly, the mutual reactions ($B_{13}+B_{14}+B_{23}+B_{24}$) can be expressed by a polynomial in wavenumber k (i.e., frequency f), similarly to the above equation.

Extension of the Approximation Coefficient Calculation Process

As previously described, the process in the approximation coefficient calculation section 2 has been such that the mutual impedance, etc. are calculated using known methods in the sample calculation processing section 4 without using approximate equations and, using the calculated results, simultaneous equations are solved in the approximation coefficient calculation processing section 5 to obtain the approximation coefficients. However, the process for obtaining the approximation coefficients in the approximation coefficient calculation section 2 is not limited to the illustrated process.

For example, the approximation coefficients may be computed by direct calculations. As indicated in the proof given for the deriving of the approximate equation for the mutual impedance, the approximation coefficients are a function of distance. Briefly described, the coefficients $C_0$, etc. at the stage immediately before deriving the approximation coefficients are expressed by the coefficients, $P_1$, etc., $Q_1$, etc., and $S_1$, etc. at the immediately preceding stage. These coefficients $P_1$, etc. are in turn expressed by u, v, w, d, etc. Since the values of u, etc. define the monopole-to-monopole distance r, these values represent the distance; since the monopole-to-monopole distance r can be defined as described above, its value can also be obtained. This shows that the approximation coefficients can be obtained by direct calculations.

This also holds true for the mutual admittance and mutual reaction. Accordingly, the approximation coefficient calculation section 2 may be configured so that the plurality of approximation coefficients used in the approximate equations expressing the mutual impedance, mutual admittance, and mutual reaction can be computed by direct calculations.

What is claimed is:

1. A computer implemented method of calculating an electromagnetic field intensity, comprising:

a) inputting geometric data of an electric circuit device located outside of the computer;

b) calculating, from the geometric data, approximation coefficients for each of approximate equations that respectively yield approximate values of electromagnetic characteristic values, between a plurality of elements constituting the electric circuit device and of the elements themselves, at an arbitrary frequency;

c) calculating approximate values of the electromagnetic characteristic values between the elements and of the elements themselves at a designated frequency in accordance with the approximate equations having the approximation coefficients calculated in b), making it possible to evaluate the electromagnetic field intensity for the designated frequency, each of said approximation equations including a real part which is a sum of terms with frequencies raised to an even numbered power and an imaginary part which is a sum of terms with frequencies raised to an odd numbered power;

d) calculating an electric current flowing on each element by solving simultaneous equations obtained by substituting the approximate values of the electromagnetic characteristic values calculated in c) into equations respectively describing boundary conditions for the elements;

e) calculating the electromagnetic field intensity for the designated frequency from the electric currents respectively flowing on the elements calculated in d); and determining, using the calculating in e), proper shielding required for the electric circuit device, wherein the b) includes:

i) calculating the electromagnetic characteristic values between the elements and of the elements themselves from geometric data of the elements at each of a plurality of sample frequencies: and ii) calculating the approximation coefficients by solving simultaneous equations obtained by substituting the electromagnetic characteristic values calculated at the plurality or sample frequencies into each of the approximate equations.

2. The method according to claim 1, wherein the electromagnetic characteristic values include mutual impedances between the elements constituting the electric circuit device and of the elements themselves.

3. A computer implemented method of calculating an electromagnetic field intensity, comprising:

a) inputting geometric data of an electric circuit device located outside of the computer;

b) calculating, from the geometric data, approximation coefficients for each of approximate equations that respectively yield approximate values of electromagnetic characteristic values, between a plurality of elements constituting the electric circuit device and of the elements themselves, at an arbitrary frequency;

c) calculating approximate values of the electromagnetic characteristic values between the elements and of the elements themselves at a designated frequency in accordance with the approximate equations having the approximation coefficients calculated in b), making it possible to evaluate the electromagnetic field intensity for the designated frequency, wherein the b) includes i) calculating the electromagnetic characteristic values between the elements and of the elements themselves from geometric data of the elements at each of a plurality of sample frequencies;

ii) calculating the approximation coefficients by solving simultaneous equations obtained by substituting the electromagnetic characteristic values calculated at the plurality of sample frequencies into each of the approximate equations wherein the bii) includes, calculating matrix elements in a lower triangular matrix and an upper triangular matrix from the sample frequencies, said lower triangular matrix and upper triangular matrix being derived from a matrix containing powers of the sample frequencies as matrix elements by being decomposed as a product of a lower triangular matrix, with diagonal elements of 1, and an upper triangular matrix;

calculating the approximation coefficient from the electromagnetic characteristic values and the matrix elements in the lower triangular matrix and the upper triangular matrix; and determining, using the calculating in c), proper shielding required for the electric circuit device.

4. A computer implemented method of calculating an electromagnetic field intensity, comprising:

a) inputting geometric data of an electric circuit device located outside of the computer:

b) calculating, from the geometric data, approximation coefficients for each of approximate equations that respectively yield approximate values of electromagnetic characteristic values, between a plurality of elements constituting the electric circuit device and of the elements themselves, at an arbitrary frequency:

c) calculating approximate values of the electromagnetic characteristic values between the elements and of the elements themselves at a designated frequency in accordance with the approximate equations having the approximation coefficients calculated in b), making it possible to evaluate the electromagnetic field intensity for the designated frequency, wherein the electromagnetic characteristic values include mutual impedances between the elements constituting the electric circuit device and of the elements themselves, wherein the elements constituting the electric circuit device include conductor elements and dielectric elements, wherein the electromagnetic characteristic values further include mutual admittances between the dielectric elements and of the dielectric elements themselves, mutual reactions between the conductor and dielectric elements, and mutual reactions between the dielectric elements and of the dielectric elements themselves; and determining, using the calculating in c), proper shielding required for the electric circuit device.

5. The method according to claim 4, further comprising:

d) calculating an electric current, and equivalent electric current, and an equivalent magnetic current flowing in each element, by solving simultaneous equations obtained by substituting the approximate values of the electromagnetic characteristic values calculated in c) into equations respectively describing boundary conditions for the elements; and e) calculating the electromagnetic field intensity for the designated frequency from the electric currents, the equivalent electric currents, and the equivalent magnetic currents respectively flowing on the elements, calculated in d).

6. The method according to claim 4, wherein the approximate equations for mutual admittances $Y_{ij}$ are $Y_{ij}=\exp(-jkr)\{a_0+a_1f^2+a_2f^4+a_3f^6+a_4f^8+ \ldots j(b_0/f+b_1f+b_2f^3+b_3f^5+b_4f^7+\ldots)\}$, where f is the frequency, k is a wavenumber where $k=2\pi f/c$ and c is the velocity of light, r is an element-to-element distance, j is an imaginary unit, and $a_0, a_1, \ldots$ and $b_0, b_1, \ldots$ are the approximation coefficients.

7. The method according to claim 4, wherein the approximate equations for mutual reactions $B_{ij}$ are $B_{ij}=\exp(-jkr)\{c_0+c_1f^2+c_2f^4+c_3f^6+c_4f^8+ \ldots j(d_0f+d_1f^3+d_2f^5+d_3f^7+d_4f^9+\ldots)\}$, where f is the frequency, k is a wavenumber where $k=2\pi f/c$ and c is the velocity of light, r is an element-to-element distance, j is an imaginary unit, and $c_0, c_1, \ldots$ and $d_0, d_1, \ldots$ are the approximation coefficients.

8. A computer implemented method of calculating an electromagnetic field intensity, comprising:
   a) inputting geometric data of an electric circuit device located outside of the computer;
   b) calculating, from the geometric data, approximation coefficients for each of approximate equations that respectively yield approximate values of electromagnetic characteristic values, between a plurality of elements constituting the electric circuit device and of the elements themselves, at an arbitrary frequency;
   c) calculating approximate values of the electromagnetic characteristic values between the elements and of the elements themselves at a designated frequency in accordance with the approximate equations having the approximation coefficients calculated in b), making it possible to evaluate the electromagnetic field intensity for the designated frequency,
   wherein the electromagnetic characteristic values include mutual impedances between the elements constituting the electric circuit device and of the elements themselves,
   wherein the approximate equations for the mutual impedances $z_{ij}$ are $z_{ij}=\exp(-jkr)\{a_0+a_1f^2+a_2f^4+a_3f^6+a_4f^8+\ldots j(b_0/f+b_1f+b_2f^3+b_3f^5+b_4f^7+\ldots)\}$, where f is the frequency, k is a wavenumber where $k=2\pi f/c$ and c is the velocity of light, r is an element-to-element distance, j is an imaginary unit, and $a_0, a_1, \ldots$ and $b_0, b_1, \ldots$ are the approximation coefficients; and
   determining, using the calculating in c), proper shielding required for the electric circuit device.

9. A computer implemented method of calculating an electromagnetic field intensity, comprising:
   a) inputting geometric data of an electric circuit device located outside of the computer;
   b) calculating, from the geometric data, approximation coefficients for each of approximate equations that respectively yield approximate values of electromagnetic characteristic values, between a plurality of elements constituting the electric circuit device and of the elements themselves, at an arbitrary frequency, each of said approximation equations including a real part which is a sum of terms with frequencies raised to an even numbered power and an imaginary part which is a sum of terms with frequencies raised to an odd numbered power;
   c) calculating approximate values of the electromagnetic characteristic values between the elements and of the elements themselves at a designated frequency in accordance with the approximate equations having the approximation coefficients calculated in b), making it possible to evaluate the electromagnetic field intensity for the designated frequency, wherein the b) includes:
      i) calculating the electromagnetic characteristic values between the elements and of the elements themselves from geometric data of the elements at each of a plurality of sample frequencies;
      ii) calculating the approximation coefficients by solving simultaneous equations obtained by substituting the electromagnetic characteristic values calculated at the plurality of sample frequencies into each of the approximate equations,
   wherein the number of sample frequencies is equal to the number of terms in a real part and in an imaginary part of each of the approximate equations; and
   determining, using the calculating in c), proper shielding required for the electric circuit device.

10. The method according to claim 9, further comprising determining values of the plurality of sample frequencies based on a specified frequency range and on the number of sample frequencies.

11. A computer implemented apparatus for calculating an electromagnetic field intensity, comprising:
   means for inputting geometric data of an electric circuit device located outside of the computer;
   means for calculating from the geometric data approximation coefficients for each of approximate equations that respectively yield approximate values of electromagnetic characteristic values, between a plurality of elements constituting the electric circuit device and of the elements themselves, at an arbitrary frequency;
   means for calculating approximate values of electromagnetic characteristic values between the elements and of the elements themselves at a designated frequency in accordance with the approximate equations having the approximation coefficients calculated by the approximation coefficient calculating means, making it possible to evaluate the electromagnetic field intensity for the designated frequency, each of said approximation equations including a real part which is a sum of terms with frequencies raised to an even numbered power and an imaginary part which is a sum of terms with frequencies raised to an odd numbered power;
   means for calculating an electric current flowing on each element by solving simultaneous equations obtained by substituting the approximate values of the electromagnetic characteristic values calculated by the approximate value calculating means into equations respectively describing boundary conditions for the elements;
   means for calculating the electromagnetic field intensity for the designated frequency from the electric currents respectively flowing on the elements, calculated by the electric current calculating means; and
   means for outputting the calculated electromagnetic field intensity, wherein the approximation coefficient calculating means comprises:
      means for calculating the electromagnetic characteristic values between the elements and of the elements themselves from geometric data of the elements at each of a plurality of sample frequencies; and
      means for calculating the approximation coefficients by solving simultaneous equations obtained by substituting the electromagnetic characteristic values calculated at the plurality of sample frequencies into each of the approximate equations.

12. An apparatus according to claim 11, wherein the electromagnetic characteristic values include mutual impedances between the elements constituting the electric circuit device and of the elements themselves.

13. A computer implemented apparatus for calculating an electromagnetic field intensity, comprising:
   means for inputting geometric data or an electric circuit device located outside of the computer;
   means for calculating from the geometric data approximation coefficients for each of approximate equations that respectively yield approximate values of electromagnetic characteristic values, between a plurality of elements constituting the electric circuit device and of the elements themselves, at an arbitrary frequency;
   means for calculating approximate values of electromagnetic characteristic values between the elements and of the elements themselves at a designated frequency in accordance with the approximate equations having the approximation coefficients calculated by the approximation coefficient calculating means, making it possible to evaluate the electromagnetic field intensity for the designated frequency;

means for calculating the electromagnetic characteristic values between the elements and of the elements themselves from geometric data of the elements at each of a plurality of sample frequencies;

means for calculating the approximation coefficients by solving simultaneous equations obtained by substituting the electromagnetic characteristic values calculated at the plurality of sample frequencies into each of the approximate equations;

means for calculating matrix elements in a lower triangular matrix and an upper triangular matrix from the sample frequencies, said lower triangular matrix and upper triangular matrix being derived from a matrix containing powers of the sample frequencies as matrix elements by being decomposed as a product of a lower triangular matrix, with diagonal elements of 1 and an upper triangular matrix;

means for calculating the approximation coefficient from the electromagnetic characteristic values and the matrix elements in the lower triangular matrix and the upper triangular matrix; and means for outputting the calculated approximation coefficient.

14. A computer implemented apparatus for calculating an electromagnetic field intensity, comprising:

means for inputting geometric data of an electric circuit device located outside of the computer;

means for calculating from the geometric data approximation coefficients for each of approximate equations that respectively yield approximate values of electromagnetic characteristic values, between a plurality of elements constituting the electric circuit device and of the elements themselves, at an arbitrary frequency;

means for calculating approximate values of electromagnetic characteristic values between the elements and of the elements themselves at a designated frequency in accordance with the approximate equations having the approximation coefficients calculated by the approximation coefficient calculating means, making it possible to evaluate the electromagnetic field intensity for the designated frequency; and means for outputting the calculated approximate values of electromagnetic characteristic values, wherein the electromagnetic characteristic values include mutual impedances between the elements constituting the electric circuit device and of the elements themselves, wherein the elements constituting the electric circuit device include conductor elements and dielectric elements, wherein the electromagnetic characteristic values further include mutual admittances between the dielectric elements and of the dielectric elements themselves, mutual reactions between the conductor and dielectric elements, and mutual reactions between the dielectric elements and of the dielectric elements themselves.

15. An apparatus according to claim 14 further comprising:

means for calculating an electric current, an equivalent electric current, and an equivalent magnetic current flowing on each element, by solving simultaneous equations obtained by substituting the approximate values of the electromagnetic characteristic values calculated by the approximate value calculating means into equations respectively describing boundary conditions for the elements; and means for calculating the electromagnetic field intensity for the designated frequency from the electric currents, the equivalent electric currents, and the equivalent magnetic current respectively flowing on the elements thus calculated.

16. An apparatus according to claim 14, wherein the approximate equations for mutual admittances $Y_{ij}$ are $Y_{ij} = \exp(-jkr) \{a_0 + a_1 f^2 + a_2 f^4 + a_3 f^6 + a_4 f^8 + \ldots j(b_0/f + b_1 f + b_2 f^3 + b_3 f^5 + b_4 f^7 + \ldots)\}$, where f is the frequency, k is a wavenumber where $k = 2\pi f/c$ and c is the velocity of light, r is an element-to-element distance, j is an imaginary unit, and $a_0, a_1, \ldots$ and $b_0, b, \ldots$ are the approximation coefficients.

17. An apparatus according to claim 14, wherein the approximate equations for mutual reactions $B_{ij}$ are $B_{ij} = \exp(-jkr) \{c_0 + c_1 f^2 + c_2 f^4 + c_3 f^6 + c_4 f^8 + \ldots j(d_0 f + d_1 f^3 + d_2 f^5 + d_3 f^7 + d_4 f^9 + \ldots)\}$, where f is the frequency, k is a wavenumber where $k = 2\pi f/c$ and c is the velocity of light, r is an element-to-element distance, j is an imaginary unit, and $c_0, c_1, \ldots$ and $d_0, d_1, \ldots$ are the approximation coefficients.

18. A computer implemented apparatus for calculating an electromagnetic field intensity, comprising:

means for inputting geometric data of an electric circuit device located outside of the computer;

means for calculating from the geometric data approximation coefficients for each of approximate equations that respectively yield approximate values of electromagnetic characteristic values, between a plurality of elements constituting the electric circuit device and of the elements themselves, at an arbitrary frequency;

means for calculating approximate values of electromagnetic characteristic values between the elements and of the elements themselves at a designated frequency in accordance with the approximate equations having the approximation coefficients calculated by the approximation coefficient calculating means, making it possible to evaluate the electromagnetic field intensity for the designated frequency; and means for outputting the calculated approximate values, wherein the electromagnetic characteristic values include mutual impedances between the elements constituting the electric circuit device and of the elements themselves, wherein the approximate equations for the mutual impedances $z_{ij}$ are $z_{ij} = \exp(-jkr) \{a_0 + a_1 f^2 + a_2 f^4 + a_3 f^6 + a_4 f^8 + \ldots j(b_0/f + b_2 f^3 + b_3 f^5 + b_4 f^7 + \ldots)\}$, where f is the frequency, k is a wavenumber where $k = 2\pi f/c$ and c is the velocity of light, r is an element-to-element distance, j is an imaginary unit, and $a_0, a_1, \ldots$ and $b_0, b_1, \ldots$ are the approximation coefficients.

19. A computer implemented apparatus for calculating an electromagnetic field intensity, comprising:

means for inputting geometric data of an electric circuit device located outside of the computer;

means for calculating from the geometric data approximation coefficients for each of approximate equations that respectively yield approximate values of electromagnetic characteristic values, between a plurality of elements constituting the electric circuit device and of the elements themselves, at an arbitrary frequency;

means for calculating approximate values of electromagnetic characteristic values between the elements and of the elements themselves at a designated frequency in accordance with the approximate equations having the approximation coefficients calculated by the approximation coefficient calculating means, making it possible to evaluate the electromagnetic field intensity for the designated frequency;

means for outputting the calculated approximate values, wherein the approximation coefficient calculating means includes:

means for calculating the electromagnetic characteristic values between the elements and of the elements themselves from geometric data of the elements at each of a plurality or sample frequencies; and means for calculating the approximation coefficients by solving simultaneous equations obtained by substituting the electromagnetic characteristic values calculated at the plurality of sample frequencies into each of the approximate equations, wherein the number of sample frequencies is equal to the number of terms in a real part and in an imaginary part of each of the approximate equations.

20. An apparatus according to claim 19 further comprising means for determining values of the plurality of sample frequencies based on a specified frequency range and on the number of sample frequencies.

21. A program storage device readable by a machine, tangibly embodying a program of instructions executable by the machine to perform a method for calculating an electromagnetic field intensity, the method comprising:

a) inputting geometric data of an electric circuit device located outside of the computer;

b) calculating, from the geometric data, approximation coefficients for each of approximate equations that respectively yield approximate values of electromagnetic characteristic values, between a plurality of elements constituting the electric circuit device and of the elements themselves, at an arbitrary frequency, each of said approximation equations including a real part which is a sum of terms with frequencies raised to an even numbered power and an imaginary part which is a sum of terms with frequencies raised to an odd numbered power;

c) calculating approximate values of the electromagnetic characteristic values between the elements and of the elements themselves at a designated frequency in accordance with the approximate equations having the approximation coefficients calculated in b), making it possible to evaluate the electromagnetic field intensity for the designated frequency;

d) calculating an electric current flowing on each element by solving simultaneous equations obtained by substituting the approximate values of the electromagnetic characteristic values calculated in c) into equations respectively describing boundary conditions for the elements;

e) calculating the electromagnetic field intensity for the designated frequency from the electric currents respectively flowing on the elements calculated in d); and determining, using the calculating in e), proper shielding required for the electric circuit device, wherein the b) comprises:

i) calculating the electromagnetic characteristic values between the elements and of the elements themselves from geometric data of the elements at each of a plurality of sample frequencies; and ii) calculating the approximation coefficients by solving simultaneous equations obtained by substituting the electromagnetic characteristic values calculated at the plurality of sample frequencies into each of the approximate equations.

22. The program storage device according to claim 21 wherein the electromagnetic characteristic values include mutual impedances between the elements constituting the electric circuit device and of the elements themselves.

23. A program storage device readable by a machine, tangibly embodying a program of instructions executable by the machine to perform a method for calculating an electromagnetic field intensity, the method comprising:

a) inputting geometric data of an electric circuit device located outside of the computer;

b) calculating, from the geometric data, approximation coefficients for each of approximate equations that respectively yield approximate values of electromagnetic characteristic values, between a plurality of elements constituting the electric circuit device and of the elements themselves, at an arbitrary frequency;

c) calculating approximate values of the electromagnetic characteristic values between the elements and of the elements themselves at a designated frequency in accordance with the approximate equations having the approximation coefficients calculated in b), making it possible to evaluate the electromagnetic field intensity for the designated frequency, wherein the b) includes i) calculating the electromagnetic characteristic values between the elements and of the elements themselves from geometric data of the elements at each of a plurality of sample frequencies;

ii) calculating the approximation coefficients by solving simultaneous equations obtained by substituting the electromagnetic characteristic values calculated at the plurality of sample frequencies into each of the approximate equations, wherein the substep b) ii) includes:

calculating matrix elements in a lower triangular matrix and an upper triangular matrix from the sample frequencies, said tower triangular matrix and upper triangular matrix being derived from a matrix containing powers of the sample frequencies as matrix elements by being decomposed as a product of a lower triangular matrix, with diagonal elements of 1, and an upper triangular matrix;

calculating the approximation coefficient from the electromagnetic characteristic values and the matrix elements in the lower triangular matrix and the upper triangular matrix; and determining, using the calculating in c), proper shielding required for the electric circuit device.

24. A program storage device readable by a machine, tangibly embodying a program of instructions executable by the machine to perform a method for calculating an electromagnetic field intensity, the method comprising:

a) inputting geometric data of an electric circuit device located outside of the computer;

b) calculating, from the geometric data, approximation coefficients for each of approximate equations that respectively yield approximate values of electromagnetic characteristic values, between a plurality of elements constituting the electric circuit device and of the elements themselves, at an arbitrary frequency;

c) calculating approximate values of the electromagnetic characteristic values between the elements and of the elements themselves at a designated frequency in accordance with the approximate equations having the approximation coefficients calculated in b), making it possible to evaluate the electromagnetic yield intensity for the designated frequency, wherein the electromagnetic characteristic values include mutual impedances between the elements constituting the electric circuit device and of the elements themselves, wherein the elements constituting the electric circuit device include conductor elements and dielectric elements, wherein the electromagnetic characteristic values further include mutual admittances between the dielectric elements and of the dielectric elements themselves, mutual reactions between the conductor and dielectric elements, and mutual reactions between the dielectric elements and of the dielectric elements themselves; and determining, using the calculating in c), proper shielding required for the electric circuit device.

25. The program storage device according to claim 24 wherein the method further comprises:

d) calculating an electric current, and equivalent electric current, and an equivalent magnetic current flowing in each element, by solving simultaneous equations obtained by substituting the approximate values of the electromagnetic characteristic values calculated in c) into equations respectively describing boundary conditions for the elements; and e) calculating the electromagnetic field intensity for the designated frequency from the electric currents, the equivalent electric currents, and the equivalent magnetic currents respectively flowing on the elements, calculated in d).

26. The program storage device according to claim 24, wherein the approximate equations for mutual admittances $Y_{ij}$ are $Y_{ij}=\exp(-jkr)\{a_0+a_1f^2+a_2f^4+a_3f^6+a_4f^8+\ldots j(b_0/f+b_1f+b_2f^3+b_3f^5+b_4f^7+\ldots)\}$, where f is the frequency, k is a wavenumber where $k=2\pi f/c$ and c is the velocity of light, r is an element-to-element distance, j is an imaginary unit, and $a_0, a_1, \ldots$ and $b_0, b_1, \ldots$ are the approximation coefficients.

27. The program storage device according to claim 24, wherein the approximate equations for mutual reactions $B_{ij}$ are $B_{ij}=\exp(-jkr)\{c_0+c_1f^2+c_2f^4+c_3f^6+c_4f^8+\ldots+j(d_0f+d_1f^3+d_2f^5+d_3f^7+d_4f^9+\ldots)\}$, where f is the frequency, k is a wavenumber where $[k=]k=2\pi f/c$ and c is the velocity of light, r is an element-to-element distance, j is an imaginary unit, and $c_0, c_1, \ldots$ and $d_0, d_1, \ldots$ are the approximation coefficients.

28. A program storage device readable by a machine, tangibly embodying a program of instructions executable by the machine to perform a method for calculating an electromagnetic field intensity, the method comprising:

a) inputting geometric data of an electric circuit device located outside of the computer;

b) calculating, from the geometric data, approximation coefficients for each of approximate equations that respectively yield approximate values of electromagnetic characteristic values, between a plurality of elements constituting the electric circuit device and of the elements themselves, at an arbitrary frequency, each of said approximation equations including a real part which is a sum of terms with frequencies raised to an even numbered power and an imaginary part which is a sum of terms with frequencies raised to an odd numbered power;

c) calculating approximate values of the electromagnetic characteristic values between the elements and of the elements themselves at a designated frequency in accordance with the approximate equations having the approximation coefficients calculated in b), making it possible to evaluate the electromagnetic field intensity for the designated frequency, wherein the approximate equations for the mutual impedances $z_{ij}$ are $z_{ij}=\exp(-jkr)\{a_0+a_1f^2+a_2f^4+a_3f^6+a_4f^8+\ldots j(b_0/f+b_1f+b_2f^3+b_3f^5+b_4f^7+\ldots)\}$, where f is the frequency, k is a wavenumber where $k=2\pi f/c$ and c is the velocity of light, r is an element-to-element distance, j is an imaginary unit, and $a_0, a_1, \ldots$ and $b_0, b_1, \ldots$ are the approximation coefficients; and determining, using the calculating in c), proper shielding required for the electric circuit device.

29. A program storage device readable by a machine, tangibly embodying a program of instructions executable by the machine to perform a method for calculating an electromagnetic field intensity, the method comprising:

a) inputting geometric data of an electric circuit device located outside of the computer;

b) calculating, from the geometric data, approximation coefficients for each of approximate equations that respectively yield approximate values of electromagnetic characteristic values, between a plurality of elements constituting the electric circuit device and of the elements themselves, at an arbitrary frequency, each of said approximation equations including a real part which is a sum of terms with frequencies raised to an even numbered power and an imaginary part which is a sum of terms with frequencies raised to an odd numbered power;

c) calculating approximate values of the electromagnetic characteristic values between the elements and of the elements themselves at a designated frequency in accordance with the approximate equations having the approximation coefficients calculated in b), making it possible to evaluate the electromagnetic field intensity for the designated frequency, wherein the b) includes i) calculating the electromagnetic characteristic values between the elements and of the elements themselves from geometric data of the elements at each of a plurality of sample frequencies;

ii) calculating the approximation coefficients by solving simultaneous equations obtained by substituting the electromagnetic characteristic values calculated at the plurality of sample frequencies into each of the approximate equations, wherein the number or sample frequencies is equal to the number of terms in a real part and in an imaginary part of each of the approximate equations; and determining, using the calculating in c), proper shielding required for the electric circuit device.

30. The program storage device according to claim 29 wherein the method further comprises determining values of the plurality of sample frequencies based on a specified frequency range and on the number of sample frequencies.

31. A computer implemented apparatus for calculating an electromagnetic field intensity, comprising:

an input unit inputting geometric data of an electric circuit device located outside of the computer;

a first unit calculating from the geometric data approximation coefficients for approximate equations that yield approximate values of electromagnetic characteristic values, each of said approximation equations including a real part which is a sum of terms with frequencies raised to an even numbered power and an imaginary part which is a sum of terms with frequencies raised to an odd numbered power;

a second unit calculating the approximate values of the electromagnetic characteristic values between elements comprising the electric circuit device and of the elements themselves;

a third unit calculating an electric current by solving simultaneous equations obtained by substituting the approximate values of the electromagnetic characteristic values into equations describing boundary conditions for the elements;

a fourth unit calculating the electromagnetic field intensity for a designated frequency from the calculated electric current; and a fifth unit outputting the calculated electromagnetic field intensity wherein the first unit further comprises:
  a sixth unit calculating electromagnetic characteristic values between the elements and of elements themselves from geometric data of elements at each of a plurality of sample frequencies; and
  a seventh unit calculating the approximation coefficients by solving simultaneous equations obtained by substituting the electromagnetic characteristic values calculated at the plurality of sample frequencies into each of the approximate equations.

32. A computer implemented method of calculating an electromagnetic field intensity, comprising:

inputting geometric data of an electric circuit device located outside of the computer;

calculating from the geometric data approximation coefficients for approximate to equations that yield approximate values of electromagnetic characteristic values, each of said approximation equations including a real part which is a sum of terms with frequencies raised to an even numbered power and an imaginary part which is a sum of terms with frequencies raised to an odd numbered power;

calculating the approximate values of the electromagnetic characteristic values between elements comprising the electric circuit device and of the elements themselves;

calculating an electric current by solving simultaneous equations obtained by substituting the approximate values of the electromagnetic characteristic values into equations describing boundary conditions for the elements;

calculating the electromagnetic field intensity for a designated frequency from the calculated electric current; and outputting the calculated electromagnetic field intensity, wherein the calculating from the geometric data approximation coefficients further comprises:
  i) calculating electromagnetic characteristic values between the elements and of elements themselves from geometric data of elements at each of a plurality of sample frequencies; and
  ii) calculating the approximation coefficients by solving simultaneous equations obtained by substituting the electromagnetic characteristic values calculated at the plurality of sample frequencies into each of the approximate equations.

33. A computer implemented apparatus calculating an electromagnetic field intensity, comprising:

a first unit inputting geometric data of an electric circuit device located outside of the computer;

a second unit calculating from the geometric data approximation coefficients for each of approximate equations that respectively yield approximate values of electromagnetic characteristic values, between a plurally of elements constituting the electric circuit device and of the elements themselves, at an arbitrary frequency, each of said approximation equations including a real part which is a sum of terms with frequencies raised to an even numbered power and an imaginary part which is a sum of terms with frequencies raised to an odd numbered power;

a third unit calculating approximate values of the electromagnetic characteristic values between the elements and of the elements themselves at a designated frequency in accordance with the approximate equations having the approximation coefficients calculated by the approximation coefficient calculating unit, thereby making it possible to evaluate the electromagnetic field intensity for the designated frequency;

a fourth unit calculating an electric current by solving simultaneous equations obtained by substituting the approximate values of the electromagnetic characteristic values into equations describing boundary conditions for the elements;

a fifth unit calculating the electromagnetic field intensity for a designated frequency from the calculated electric current; and a sixth unit outputting the calculated electromagnetic field intensity, wherein the second unit further comprises:
  a seventh unit calculating electromagnetic characteristic values between the elements and of elements themselves from geometric data of elements at each of a plurality or sample frequencies; and
  an eighth unit calculating the approximation coefficients by solving simultaneous equations obtained by substituting the electromagnetic characteristic values calculated at the plurality of sample frequencies into each of the approximate equations.

* * * * *

UNITED STATES PATENT AND TRADEMARK OFFICE
CERTIFICATE OF CORRECTION

PATENT NO.    : 6,604,225 B1
DATED         : August 5, 2003
INVENTOR(S)   : Shinichi Otsu et al.

It is certified that error appears in the above-identified patent and that said Letters Patent is hereby corrected as shown below:

<u>Column 27,</u>
Line 16, begin a new paragraph with "determining".

<u>Column 30,</u>
Line 38, begin a new paragraph with "wherein".

<u>Column 32,</u>
Line 51, after "J(b0/" insert -- +b1f --.
Line 65, after "frequency" insert -- , , each of said approximation equations including a real part which is a sum of terms with frequencies raised to an even numbered power and an imaginary part which is a sum of terms with frequencies raised to an odd numbered power --.

<u>Column 33,</u>
Line 8, begin a new paragraph with "wherein".

Signed and Sealed this

Twenty-third Day of March, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,604,225 B1
DATED : August 5, 2003
INVENTOR(S) : Shinichi Otsu et al.

It is certified that error appears in the above-identified patent and that said Letters Patent is hereby corrected as shown below:

Column 29,
Line 53, begin a new paragraph with -- wherein --.

Signed and Sealed this

Twenty-seventh Day of July, 2004

JON W. DUDAS
*Acting Director of the United States Patent and Trademark Office*